Dec. 20, 1966  G. G. GRIMMER ETAL  3,292,706
FLUID PRESSURE RESPONSIVE VALVE
Filed July 26, 1963  7 Sheets-Sheet 1

Fig. 1-A

INVENTORS
George G. Grimmer
Leonard McCasland

BY
ATTORNEYS

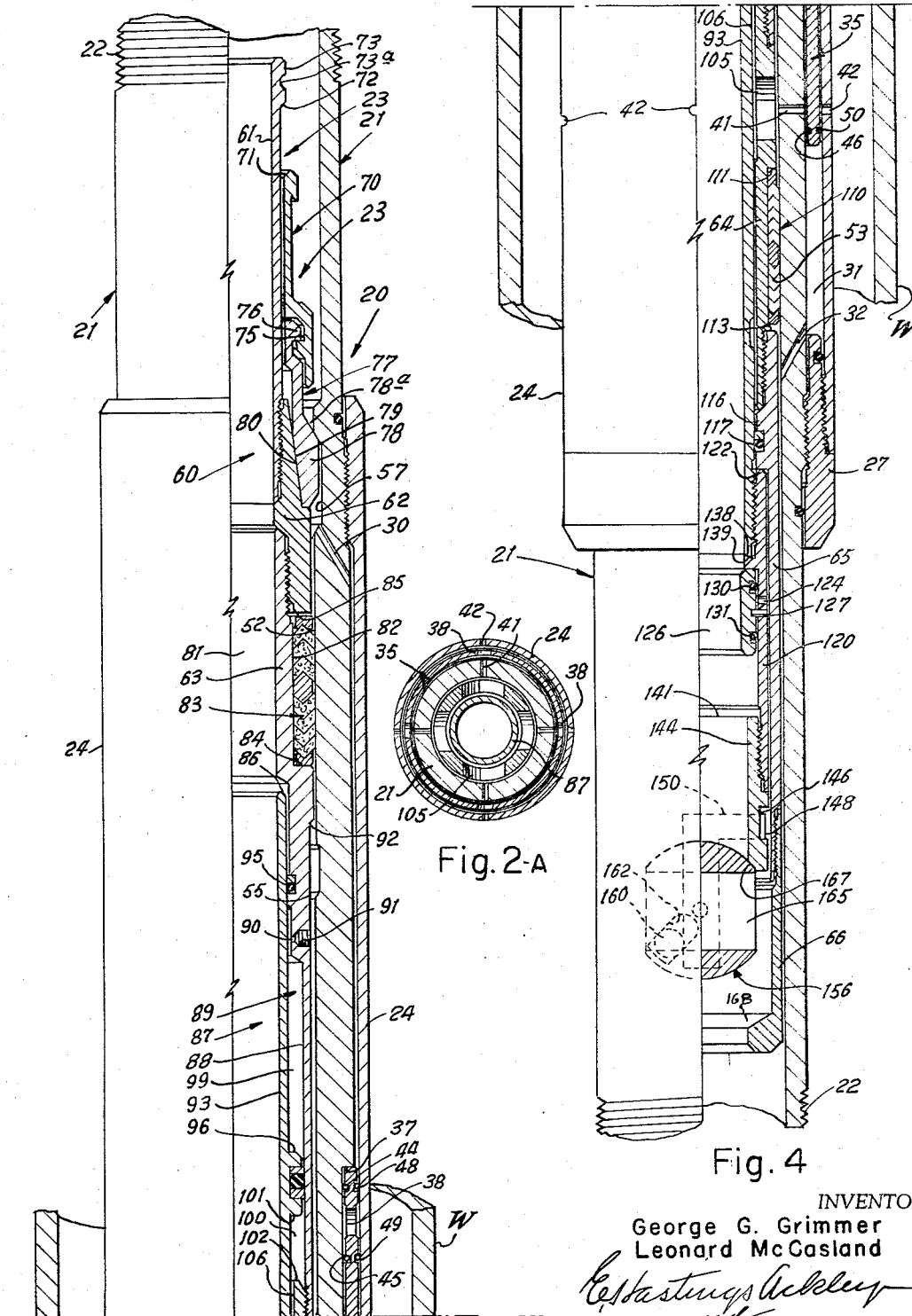

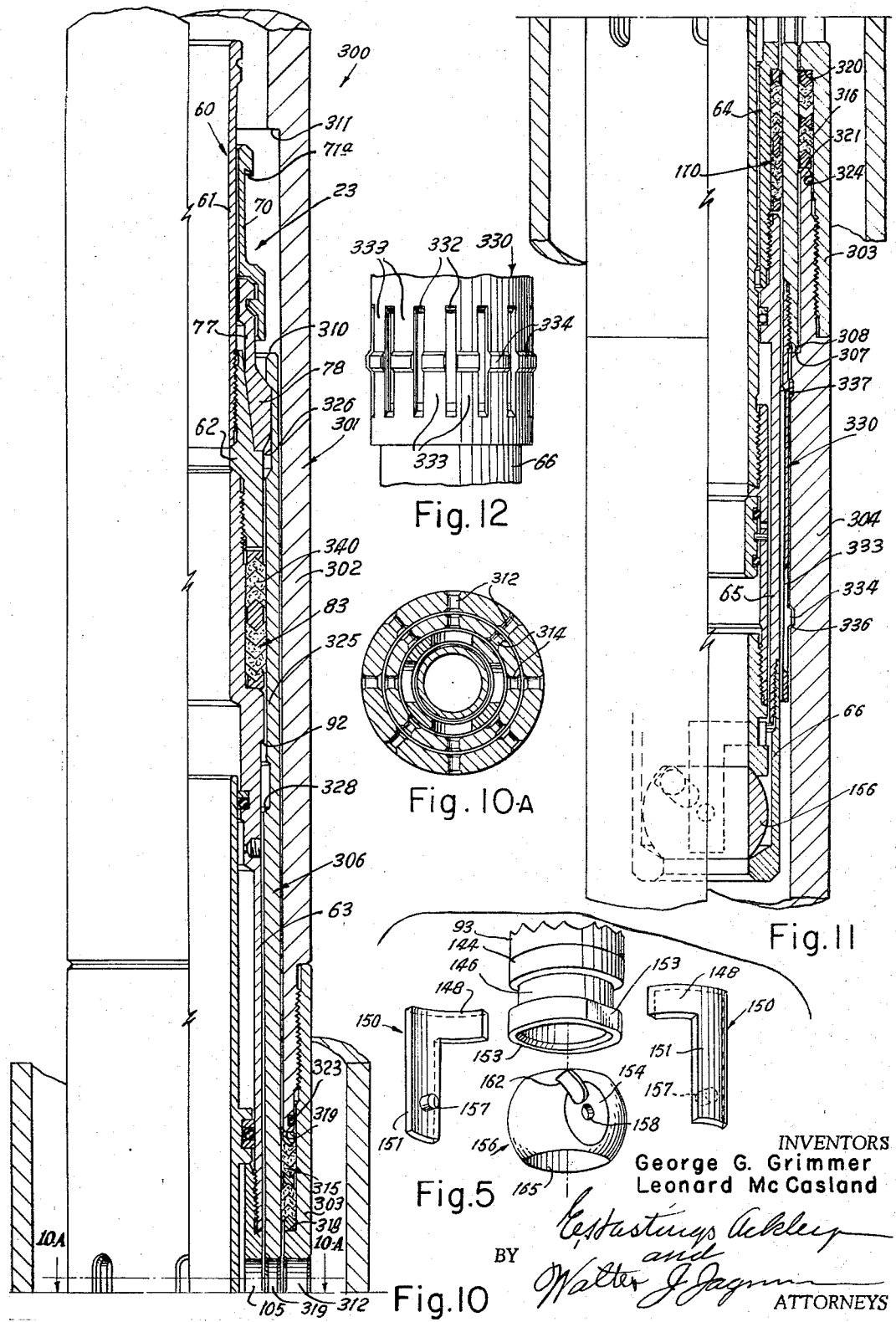

Dec. 20, 1966  G. G. GRIMMER ETAL  3,292,706
FLUID PRESSURE RESPONSIVE VALVE
Filed July 26, 1963  7 Sheets-Sheet 4

Fig. 7-A

INVENTORS
George G. Grimmer
Leonard McCasland
BY
ATTORNEYS

INVENTORS
George G. Grimmer
Leonard McCasland

BY

ATTORNEYS

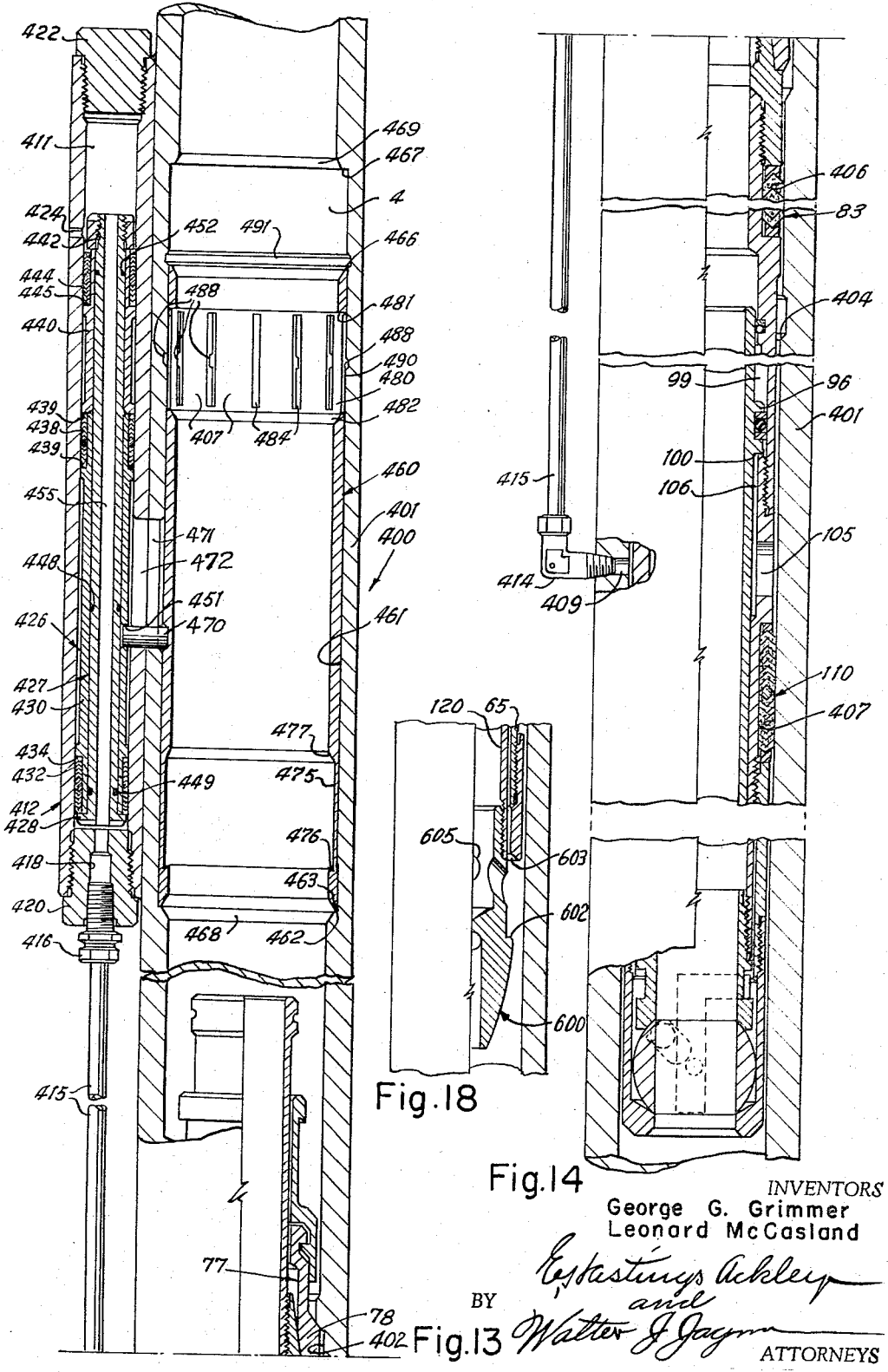

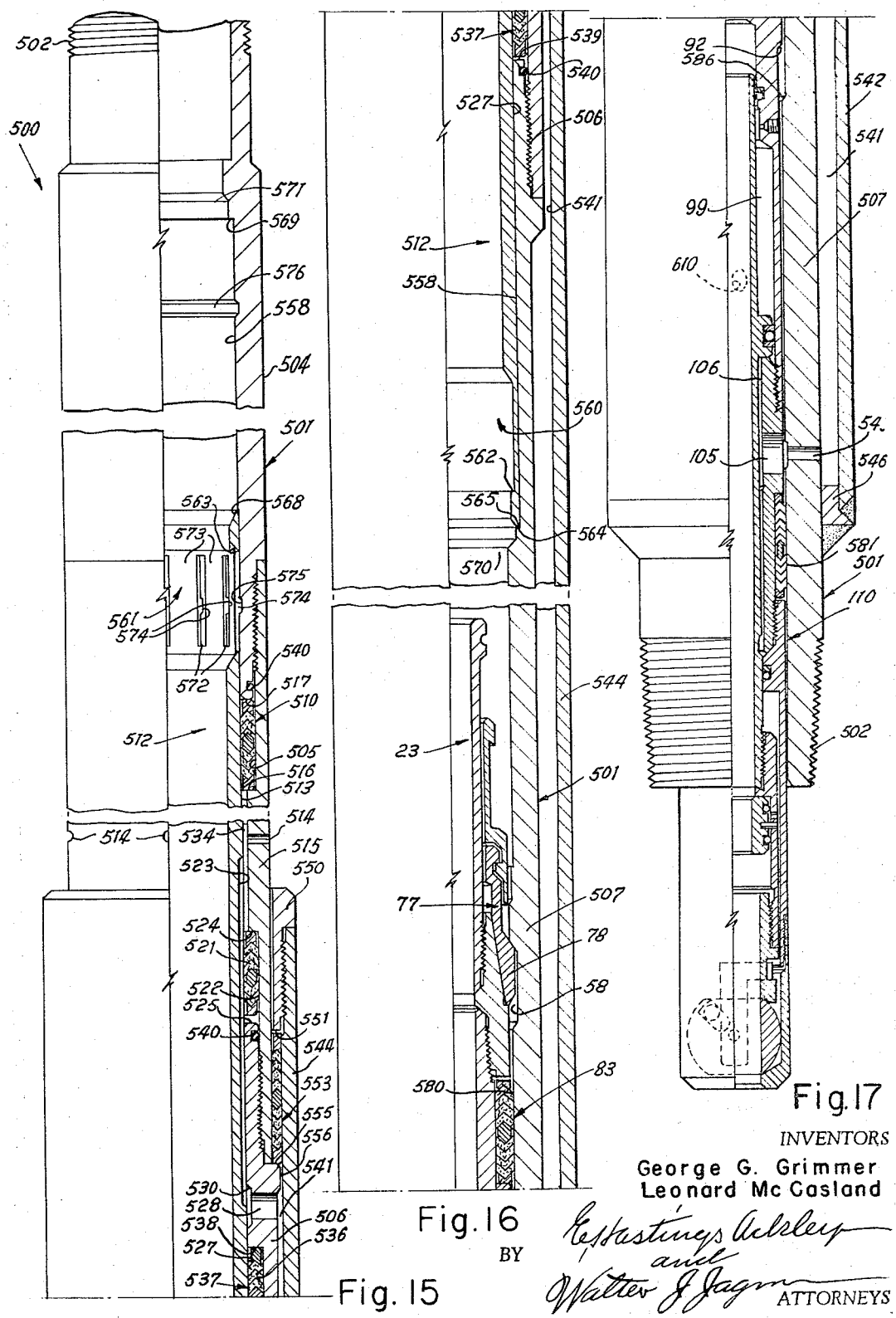

United States Patent Office 3,292,706
Patented Dec. 20, 1966

3,292,706
FLUID PRESSURE RESPONSIVE VALVE
George G. Grimmer and Leonard McCasland, Dallas, Tex., assignors to Otis Engineering Corporation, Dallas, Tex., a corporation of Delaware
Filed July 26, 1963, Ser. No. 297,933
27 Claims. (Cl. 166—224)

This invention relates to well tools and more particularly to a well tool for closing the flow passage of an inner flow conductor telescoped in an outer tubular member when the pressure in the annulus between the flow conductor and the tubular member exceeds a predetermined value.

An object of this invention is to provide a new and improved well tool having a nipple connectable in a flow conductor, such as a tubing, and a valve removably positionable in the nipple which is movable to a closed position when the pressure in the annulus between the flow conductor and an outer tubular member, such as a well casing, through which the flow conductor extends, exceeds a predetermined value.

Still another object is to provide a well tool wherein the valve is provided with operator means and the nipple with means for exposing the operator means of the valve to pressure from exteriorly of the nipple.

Still another object is to provide a well tool wherein the means for exposing the valve to pressure includes an auxiliary valve movable by a pressure differential across longitudinally spaced locations in the flow conductor.

Still another object is to provide a well tool wherein the auxiliary valve is movable to its open position by a well tool movable through the string of tubing.

A further object is to provide a new and improved valve responsive to the pressure in the annulus between a string of tubing and a well casing above a packer closing the annulus for closing the flow passage of the tubing when the pressure in the annulus above such packer exceeds a predetermined value which may occur if a leak occurs in the tubing permitting the pressure within the tubing to be communicated to the annulus above the packer which, when its force is added to the force of the hydrostatic pressure of the weighted liquid filling the annulus above the packer, may cause failure of the tubing or of the well casing.

A still further object is to provide a valve having a valve operator means exposed to the pressure exteriorly of the tubing for closing the valve when the pressure exteriorly of the tubing exceeds a predetermined value.

A further object is to provide a valve having pressure equalizing valve means for equalizing the pressure across the valve prior to the reopening of the valve.

Another object is to provide a well tool having auxiliary valve means controlling the access of the pressure from exteriorly of the tubing to the operator means which is moved to a closed position to shield the operator means from the exterior pressure after the valve has been closed and is held in the closed position as long as the pressure below the valve in the tubing exceeds the pressure in the tubing above the valve.

Another object is to provide a valve wherein the auxiliary valve means is movable from its closed to its open position by a pressure differential between longitudinally spaced points in the interior of the tubing whereby the auxiliary valve means may be lowered into a well while in its closed position and moved to its open position, after the valve has been positioned in the tubing, to expose the operator means to pressure from exteriorly of the tubing.

Still another object is to provide a valve wherein the operator means for moving the valve between its closed and open positions includes a piston biased to a position wherein it holds the valve in open position, and exposed to the pressure exteriorly of the tubing through a port in the tubing which biases the piston toward a position wherein it holds the valve in closed position, and auxiliary valve means for closing the port when the valve is moved to closed position and the pressure in the tubing above the valve exceeds the pressure in the tubing below the valve.

Additional objects and advantages of the invention will be readily apparent from the reading of the following description of a device constructed in accordance with the invention, and reference to the accompanying drawings thereof, wherein:

FIGURE 1A is a vertical, partly sectional schematic view showing a tubing in position in a well casing and having the well tool embodying the invention connected therein;

FIGURE 2A is a sectional view taken on line 2A—2A of FIGURE 2;

FIGURE 3 is a vertical, partly sectional view of the upper portions of the well tool showing the operative elements thereof in the positions assumed thereby when the valve is in closed position preventing flow of fluid through the string of tubing;

FIGURE 4 is a view similar to FIGURE 3 being a continuation thereof and showing the lower portions of the well tool;

FIGURE 5 is an exploded perspective view showing the ball valve of the well tool shown in FIGURES 1–3 and the means for moving it vertically in the valve mandrel;

FIGURE 7A is a sectional view taken on line 7A—7A of FIGURE 7;

FIGURE 10 is a vertical, partly sectional view of the upper portions of another modified form of the well tool showing it in position in a tubing and with the operative elements thereof in the positions assumed thereby when the valve is in open position;

FIGURE 10A is a sectional view taken on the line 10A—10A of FIGURE 10;

FIGURE 11 is a view similar to FIGURE 10, being a continuation thereof and showing the lower portions of the well tool;

FIGURE 12 is a fragmentary vertical view of a collet section of the auxiliary valve of the well tool illustrated in FIGURES 10 and 11;

FIGURE 13 is a vertical partly sectional view of the upper portions of another modified form of the well tool;

FIGURE 14 is a view similar to FIGURE 13, being a continuation thereof showing the lower portions thereof;

FIGURE 15 is a vertical partly sectional view of the upper portions of another modified form of the well tool;

FIGURE 16 is a view similar to FIGURE 15, being a continuation thereof, showing the intermediate portions of the well tool;

FIGURE 17 is a view similar to FIGURE 15, being a continuation thereof, showing the lower portions of the well tool; and, FIGURE 18 is a fragmentary vertical partly sectional view of a plug valve usable in place of the ball valve in the valve of the different forms of the well tool illustrated in FIGURES 1 through 17.

Figure 1:
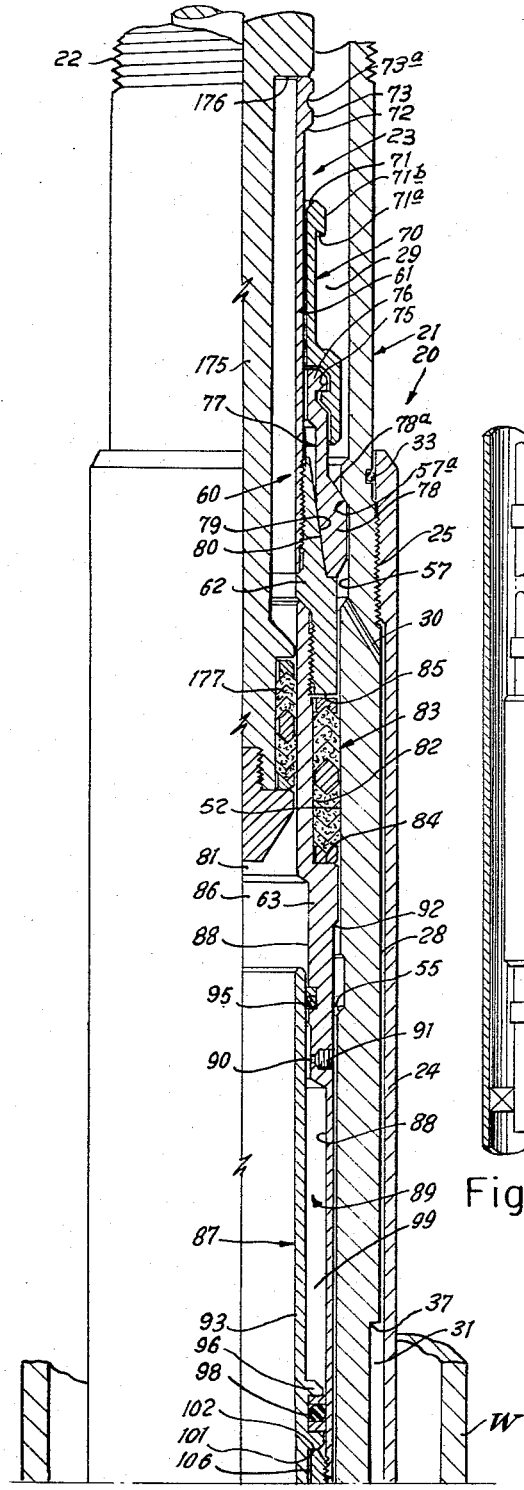
FIGURE 1 is a vertical, partly sectional view of the upper portions of a well tool embodying the invention connected in tubing positioned in a well casing and showing the operative elements of the valve in positions holding the valve open and permitting flow of fluid through the tubing.

Referring now particularly to FIGURES 1A and 1 through 5 of the drawings, the well tool 20 embodying the invention includes a tubular nipple 21 having threaded end portions 22 by means of which it is connectable in a tubing T to constitute a section thereof and a valve 23 removably positionable in the nipple.

The nipple is connected at opposite ends to the usual tubing sections S of the tubing by means of the usual tubing couplings C and is located above a packer P which closes the annulus between the tubing and the well casing W above an earth formation from which well fluids flow through suitable perforations in the casing into the casing below the packer and thence upwardly into the flow passage of the tubing through its open lower end.

A sleeve 24 positioned on the nipple has an upper end portion secured to the nipple as at 25 and a lower end portion threaded on an annular retainer plug 27 which in turn is threaded on the nipple. The sleeve and the nipple define an upper annular passage 28, whose upper end communicates with the interior or longitudinal passage 29 of the nipple by means of the port 30 thereof and whose lower end opens into an annular valve chamber 31. The lower end of the valve chamber communicates with the longitudinal passage of the nipple through the port 32. The nipple is provided with external annular recesses in which are provided the O-rings 33 and 34 which seal between the nipple and the sleeve 24 and the plug 27 above and below the ports 30 and 32. The plug 27 is provided with a similar external recess in which is disposed an O-ring 34a which seals between the lower end of the sleeve and the plug.

Figure 2:
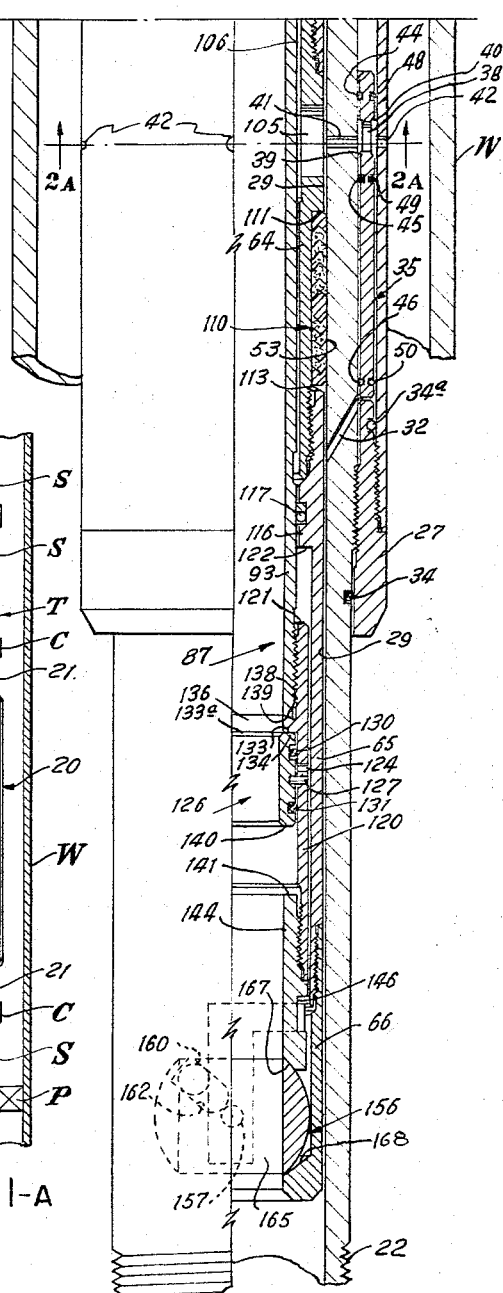
FIGURE 2 is a view similar to FIGURE 1, being a continuation thereof, and showing the lower portions of the well tool.
Figure 6:
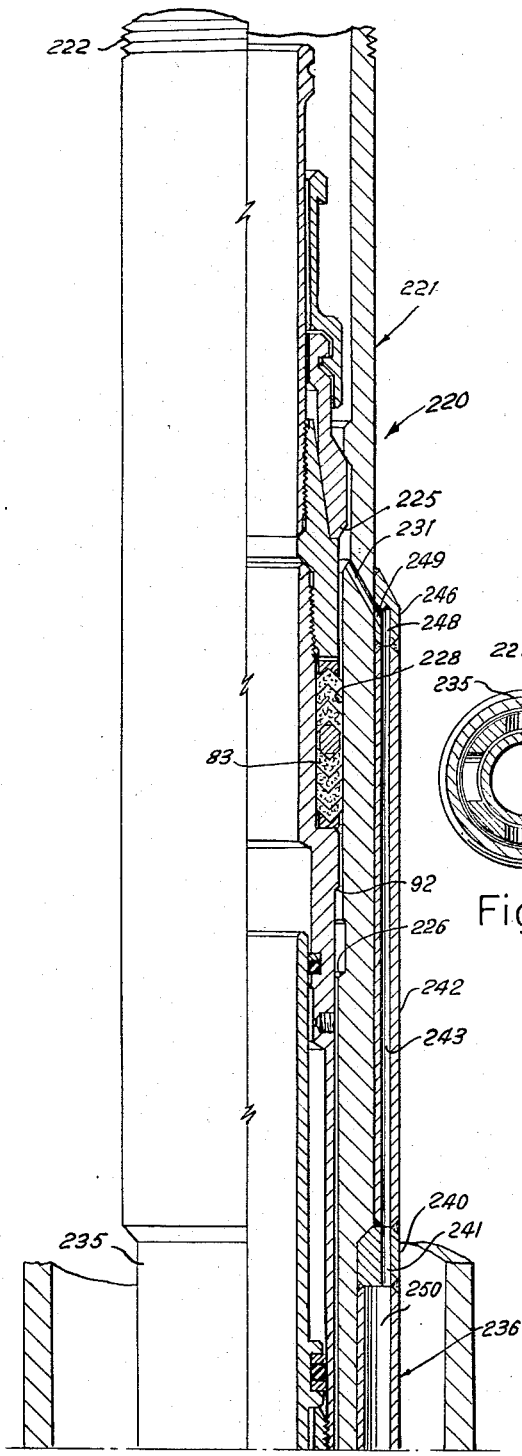
FIGURE 6 is a vertical, partly sectional view of the upper portions of a modified form of the well tool showing the elements of the valve in the positions assumed thereby when the valve is in its open position.
Figure 7:
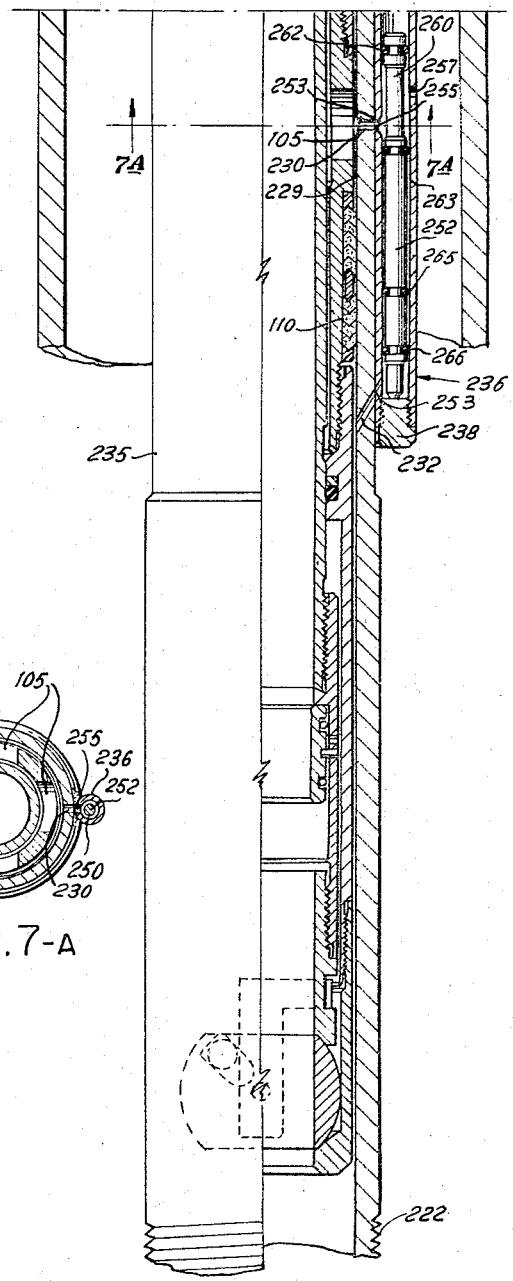
FIGURE 7 is a view similar to FIGURE 6, being a continuation thereof, and showing the lower portions of the well tool.

An annular auxiliary valve 35 is slidably mounted for vertical movement in the valve chamber between the lower position illustrated in FIGURE 2 wherein its downward movement in the auxiliary valve chamber is limited by the engagement of its lower end with the upper end of the plug 27 and the upper position illustrated in FIGURES 3 and 4 wherein its upward movement is limited by the engagement of its upper end with the downwardly facing annular stop shoulder 37 of the nipple defining the upper end of the auxiliary valve chamber.

The auxiliary valve 35 has a plurality of circumferentially spaced ports 38 which open into the aligned internal and external annular recesses 39 and 40 thereof which are aligned and communicate with the ports 41 and 42 of the nipple and of the sleeve 24, respectively, when the auxiliary valve is in its lower or open position in the valve chamber 31.

The auxiliary valve has internal annular recesses in which are disposed O-rings 44, 45 and 46 which seal between the valve and the nipple and external annular recesses in which are disposed the O-rings 48, 49 and 50 which seal between the valve and the sleeve. When the valve sleeve is in its lower position, the O-rings 44 and 45 seal between the valve sleeve and the nipple on opposite sides of the ports 38 and 40 and the O-rings 48 and 49 seal between the valve and the sleeve on opposite sides of the ports 38 and 42. When the valve sleeve is in the upper position illustrated in FIGURES 3 and 4, the O-rings 45 and 46 seal between the valve and the nipple on opposite sides of the nipple ports 41 and the O-rings 49 and 50 seal on opposite sides of the sleeve ports 42.

It will thus be apparent that when the auxiliary valve 35 is in its lower position, the pressure of fluid from exteriorly of the nipple and therefore from exteriorly of the tubing of which the nipple constitutes a section and above the packer P is communicated to the interior passage or bore 29 of the nipple through the port 38 of the valve sleeve and the ports 41 and 42 of the nipple, respectively, and that when the auxiliary valve is in its upper position it prevents communication of such fluid pressure to the passage or bore 29 of the nipple. The nipple is provided with a seal surface 52 immediately below the upper ports 30 thereof and with a seal surface 53 between the ports 32 and 41.

The flow passage or bore 29 is enlarged above the ports 41 to provide the annular upwardly facing stop shoulder 55 and has an internal annular dog or latch recess 57 above the upper seal surface 52 into which the upper ends of the upper ports 30 open.

The valve 23 includes a mandrel 60 having a top section 61, a dog expander section 62 threaded on the lower end of the top section, a piston section 63 threaded into the lower end of the expander section, a port section 64 whose upper end is threaded into the lower end of the piston section, a connector section 65 whose upper end is threaded on the lower end of the port section, and a bottom or ball valve housing section 66 whose upper end is threaded on the connector section.

A cylindrical dog carrier 70 is mounted on the top mandrel section 61 for limited longitudinal movement thereon, its upward movement on the top mandrel section of the valve being limited by the engagement of its upper annular shoulder 71 with the downwardly facing annular shoulder 72 provided by the external top flange 73 of the top section. The dog carrier is provided with an internal annular recess 75 in which are movably received the outwardly laterally extending hooks 76 on the upper ends of the dogs 77 whose bosses 78 are receivable in the latch recess 57 of the nipple, and are movable laterally outwardly thereinto by the downwardly and outwardly beveled expander surface 79 of the expander mandrel section 62 which engages the internal cam surfaces 80 of the dogs when the mandrel is moved upwardly relative to the dog carrier and the dogs.

The piston mandrel section 63 has an upper internal seal surface 81 and an upwardly opening annular upper end recess 82 in which is disposed the seal assembly 83. Downward movement of the seal assembly on the mandrel is limited by the upwardly facing annular shoulder 84 of the piston section defining the lower end of the end recess and upward movement thereof on the mandrel is limited by the annular downwardly facing annular surface 85 of the expander section 62.

The internal bore of the piston section is enlarged as at 86 to receive the upper end of the tubular piston 87 and is further enlarged as at 88 to provide with the piston 87 a chamber 89 into whose upper end gas under pressure may be introduced through the inlet or charging port 90 of the piston section which is closed by the plug 91 threaded in the enlarged outer portion of the charging port. The piston mandrel section has an external downwardly facing annular stop shoulder 92 which is engageable with the nipple shoulder 55 for limiting downward movement of the mandrel in the nipple.

The piston 87 includes a top section 93 whose upper end extends into the enlarged portion 88 of the bore of the piston mandrel section. An O-ring 95 disposed in an internal annular recess of the piston mandrel section seals between the top piston section 93 and the piston mandrel section.

The top piston section has an external annular piston flange 96 intermediate its ends which extends into the annular chamber and is provided with an external annular recess in which is disposed the O-ring 98 which seals between the piston mandrel section and the piston flange. It will be apparent therefore that the chamber 89 is divided into upper and lower compartments 99 and 100, respectively, by the piston flange. Downward movement of the piston in the mandrel is limited by the engagement of the lower annular end surface 101 of the piston flange with the upper annular end surface 102 of the port mandrel section 64.

The portion section 64 of the mandrel has a plurality of circumferentially spaced ports 105 which communicate with the nipple ports 41 and with the annular passage 106 between the piston and the nipple which opens upwardly into the lower compartment 100 so that when the auxiliary or nipple valve 35 is in its lower open position the pressure from the exterior of the mandrel is communicated to the lower compartment and exerts an upward force on the piston in order that the piston be moved upwardly whenever the pressure from exteriorly of the nipple exceeds the downward force exerted on the piston by the charge of compressed gas in the upper or pressure compartment 99.

A seal assembly 110 is disposed on the port mandrel section 64. Upward movement of the seal assembly on the port mandrel section is limited by the downwardly facing annular shoulder 111 thereof and downward movement of the seal assembly is limited by the top annular end surface 113 of the connector mandrel section 65. The upper and lower seal assemblies 83 and 110 prevent any flow of fluids or communication of pressure from the ports 41 between the valve mandrel and the nipple to the internal passage or bore of the nipple. The connector mandrel section has an internal annular flange 116 provided with an internal annular recess in which is disposed an O-ring 117 which seals between the top piston section and the mandrel below the ports 105 which prevent any flow of fluid from the exterior through the ports 105 and downwardly between the piston and the mandrel.

The piston 87 includes an equilizing port section 120 whose upper end is threaded on the lower end of the top piston section 93 and whose upper annular end surface 121 is engageable with the downwardly facing annular end surface 122 of the internal flange 116 of the mandrel to limit upward movement of the piston in the mandrel. The equalizing port section 120 has a plurality of circumferentially spaced ports 124 which are closed by an annular pressure equalizing valve 126 releasably held in its upper port closing position illustrated in FIGURES 2 and 4 by one or more shear pins 127 which extend through suitable bores or apertures in the equalizing port section 120 into a suitable external annular recess of the equalizing valve. The O-rings 130 and 131 disposed in external annular recesses of the equalizing valve seal between the equalizing valve and the equalizing port section above and below the ports 124 when the equalizing valve is in its upper closed position. Upward movement of the equalizing valve in the piston is limited by the engagement of its top annular end surface 133 with an annular downwardly facing end surface 134 of the internal annular flange 136 of the piston. The upper downwardly and outwardly inclined or beveled seal surface 138 of the flange is engaged by the similarly tapered annular bottom end surface 139 of the top piston section which thus provide a metal to metal seal between the top and port sections of the piston. Downward movement of the equalizing valve on the piston is limited by the engagement of its annular bottom end surface 140 with the annular upwardly facing end surface 141 of the bottom section 144 of the piston which is threaded into the lower end of the port piston section 120.

The bottom piston section has an external annular recess 146 in which are receivable the arcuate top portions 148 of the pair of valve operator members 150 whose dependent leg portions 151 extend past the flat surfaces 153 of the bottom piston section and flattened side surface 154 of the ball valve 156. The legs 151 of the operator members have inwardly extending pins 157 which extend into the diametrically opposed bores 158 of the ball valve.

The movement of the ball valve in the bottom mandrel section 66 is controlled by a pair of pins 160 rigidly secured to the bottom mandrel section, extending inwardly into the slots 162 of the ball valve which extend radially outwardly and upwardly when the ball valve is in its open position illustrated in FIGURE 2 and which open radially outwardly and downwardly when the valve is in its closed position illustrated in FIGURE 4. The surfaces of the valve defining the radial slots engage the pins 160 and cause the ball to rotate through ninety degrees about the pins 157 as the ball is moved longitudinally in the bottom mandrel section 66 between its lower open and upper closed positions. The ball valve has a flow passage 165 which is in alignment and communication with the flow passage of the piston when the valve is in its open position and which is disposed transversely to and out of communication with the flow passage of the piston when the valve is in its upper closed position illustrated in FIGURE 4. The outer spherical surface of the ball valve sealingly engages the arcuate annular seat surface 167 of the bottom section 144 of the piston. The bottom section 66 of the valve mandrel has an internal annular flange 168 which serves to limit downward movement of the ball valve in the housing.

In use, the landing nipple 21 of the well tool 20 is connected in the string of tubing in the usual manner by means of the usual couplings or collars C in which opposite threaded end portions 22 of the nipple are receivable and the auxiliary valve 35 is positioned in its upper position being retained therein by the frictional engagement of its O-rings with the nipple and the sleeve 24 thereof. The tubing is then lowered into a desired position in the well casing W and the packer P carried by the tubing below the valve is then moved into sealing engagement with the casing to close the annulus between the well casing and the tubing below the ball valve. A column of weighted liquid, such as mud, is then introduced into the annulus in any suitable manner and the hydrostatic pressure exerted by such column of weighted liquid is approximately equal to the earth formation pressures in order that the packer and casing be subjected to little or no pressure differential since the composition and specific gravity of the liquid is so chosen that the hydrostatic pressure of the column of weighted liquid offsets or balances the formation pressures exteriorly of the casing throughout the length of the casing and below the packer. The auxiliary or nipple valve 35 which is held in its upper closed position by its frictional engagement with the nipple 21 and its sleeve 24 prevents any of the weighted liquid from flowing into the nipple through the ports 42 and 41 of the nipple sleeve and the nipple, respectively.

The valve 23 may then be inserted into the tubing and moved downwardly into the landing nipple by means of a flexible wire line and the usual string of wire line tools which includes jars and a suitable running tool, as, for example, the Type T Otis Running Tool illustrated on page 3931 of the 1962–63 edition of the Composite Catalog of Oilfield Equipment and Services, which has means, such as shear pins, receivable in tangential slots 73a of the top external flange of the top section 61 of the valve mandrel, which releasably secure the valve mandrel 60 to the running tool, and has means for releasably engaging the undercut annular shoulder 71a provided by the external annular flange 71b at the upper end of the dog carrier to hold it in its upper position on the top mandrel section 61 so that the dogs are held in or are free to move into their retracted positions.

The charge of gas under pressure in the upper compartment 99 of the valve holds the piston 87 in the lower position illustrated in FIGURES 1 and 2 and therefore holds the ball valve in its open lower position in the mandrel.

The valve 23 is lowered through the string of tubing until the stop shoulder 92 thereof engages the upwardly facing stop shoulder 55 of the nipple and downward movement of the valve through the nipple is arrested. In this position of the valve mandrel, the dogs 77 which are still held in their upper positions on the mandrel by the running tool are in alignment with the latch recess 57. Downward jars then imparted to the running tool disengage the running tool from the undercut shoulder 71a of the slip so that an upward pull then imparted by means of the running tool to the upper end of the mandrel moves the mandrel upwardly causing the expander surface 79 to move the dog bosses outwardly into the latch recess 57 and then causes the shear pins securing the running tool to the top section of the mandrel to fail when upward movement of the mandrel in the nipple is arrested upon the dogs reaching their expanded positions in the latch recess and their upper surfaces 78a engaging the upper annular shoulder 57a defining the upper end of the latch recess. The running tool is removed upwardly from the tubing by the flexible line. A suitable plug 175 may then be lowered by means of a flexible line and the usual flexible line tools into the well tubing until its annular stop shoulder 176 engages the top end of the mandrel and its seal assembly 177 sealingly engages the seal surface 81 of the mandrel, and closes the flow passage of the mandrel above the piston. Fluid under pressure is then introduced into the tubing at the surface until the downward force thereof exerted on the upper end of the auxiliary valve 35 moves the auxiliary valve downwardly to its lower open position so that the annulus between the tubing and the well casing above the packer is placed in communication with the annular passage 106 and the pressure of the fluid at such location exteriorly of the tubing is communicated to the lower compartment 100 and the lower end of the piston flange and biases the piston upwardly. The fluid pressure from the tubing above the plug is communicated to the upper chamber 31 through the upper ports 30 of the mandrel and the annular passage 28. When the pressure in the tubing above the valve is thus increased and exceeds the pressure therebelow, the valve mandrel of course tends to move downwardly but its downward movement is arrested by the engagement of its external stop shoulder 92 with the stop shoulder 55 of the nipple and when the pressure above the valve is decreased, the pressure differential across the mandrel will again cause it to move upwardly but since the bosses of the dogs 77 remain aligned with and in the latch recess 57, such subsequent upward movement of the mandrel again causes the expander surface 79 to hold the dogs in their expanded position limiting upward movement of the valve in the tubing.

The auxiliary valve is now in the lower open position illustrated in FIGURES 1 and 2 since the pressure within the tubing below the valve communicated to the lower end of the chamber 31 through the tubing and the lower ports 32 of the nipple, is substantially equal to the pressure from the tubing above the valve communicated to the upper end of the chamber 31 through the ports 30. The pressure from the annulus between the tubing and the casing above the packer is of course communicated to the downwardly facing surfaces of the piston flange 96 of the piston 86 through the ports 42, 38, 41 and 105 and the annular passage 106 so that the force of this pressure biases the piston 87 upwardly. The force of the charge of the compressed gas in the variable capacity chamber 99, however, is sufficiently great, when the pressure in the annulus above the packer at the ports 42 does not exceed a predetermined value, to maintain the piston in its lower position holding the ball valve 156 in its lower open position in the bottom or housing section 66 of the valve mandrel so that flow of fluids may take place upwardly through the tubing and through the valve. Should for some reason the pressure within the annulus above the packer increase, as for example due to a leak developing in the tubing above the valve, the pressure within the tubing is immediately communicated to the annulus above the packer and its force, when added to the hydrostatic pressure of force exerted by the column of mud or weighted liquid in the annulus above the packer, causes the upward force exerted on the piston flange to exceed the downward force of the compressed gas and the piston moves upwardly from the position illustrated in FIGURES 1 and 2 to the position illustrated in FIGURES 3 and 4. During such upward movement of the piston the valve is caused to move upwardly therewith and to rotate in a counter-clockwise direction about the pivot pins 157 of the ball valve operator members 140 due to the camming action of the pins 160 with the sides of the slots 162 so that the valve is thus moved to its closed position with its flow passage out of communication with the flow passage of the piston. The pressure below the well packer is now shut off from the upper portions of the longitudinal passage of the tubing above the ball valve and as the well fluid continues to flow out of the upper end of the tubing at the surface the pressure in the tubing above the valve decreases quickly and prevents the development of excessive pressures in the annulus which could cause rupture of the well casing or crushing of the tubing.

Once the valve moves to its closed position the pressure in the tubing above the ball valve decreases, due to the flow of the fluid from the tubing at the surface, and the pressure of the well formation from below the packer communicated to the lower end of the annular valve chamber 31 is greater than the pressure communication to the upper end of the chamber through the upper ports 30 of the nipple and moves the auxiliary valve to its upper position shutting off communication between the interior of the nipple and the exterior thereof. The fluid in the flow passage 106 and the compartment 100 below the piston flange 96 is trapped preventing downward movement of the piston in the mandrel and the movement of the ball valve to its open position since the ports 41 of the nipple are now closed by the auxiliary valve 35. The pressure from the earth formations below the packer acting across the area of sealing engagement of the O-ring 117 with the piston exerts a great upward force on the piston and also holds it in its upper position.

If it is now desired to remove the valve 23 from the well tool, a suitable pulling tool, such as the Otis Type R. Pulling Tool, illustrated on page 3933 of the 1962–63 Edition of the Composite Catalog of Oilfield Equipment and Services, and provided with a suitable prong which is engageable with the inwardly projecting upper shoulder 133a of the equalizing valve 126 is lowered into the tubing by means of a flexible line and the usual line tools until the prong engages the equalizing valve. Downward jars then imparted to the well tool shear the shear pins 127 and move the equalizing valve to its lower position whereupon the pressure in the tubing above and below the closed ball valve 156 equalizes through the ports 124. Since the pressure across the valve is now equalized, it may be unlocked from the nipple and moved upwardly through the well tubing. Further downward jars are now imparted to the running tool driving the valve mandrel 69 downwardly until its stop shoulder 92 engages the stop shoulder 55 of the nipple and its hooks engage the undercut annular shoulder 71a of the dog carrier 70 whereupon upward movement imparted to the running tool moves the slip carrier and the dogs upwardly on the mandrel. The camming engagement of the upper surfaces of the dogs with the upper surfaces of the mandrel defining the upper end of the latch recess 57 cams the dogs inwardly to their inner positions during such upward movement. The dog carrier 70 moves upwardly on the mandrel until its shoulder 71 engages the shoulder 72 of the flange 73 of the top mandrel section 61 and the valve mandrel moves upwardly so that the valve 23 is now moved upwardly as a unit through the tubing.

The ball valve 156 remains closed during such upward movement through the mandrel due to the fact that the incompressible liquid trapped below the piston flange 96 in the compartment 100 and in the passage 106 cannot escape therefrom until the upper seal assembly 83 of the valve moves upwardly and out of engagement with the seal surface 52 of the mandrel whereupon such trapped fluid may escape from compartment 100 through the ports 105 which are thus placed in communication with the upper portion of the longitudinal passage of the mandrel. The charge of compressed gas in the chamber 89 then moves the piston downwardly and thus moves the valve to its open position so that continued upward movement of the valve through the string of tubing is now facilitated since the fluids or liquids filling the tubing may now flow through the mandrel, the tubular piston and the passage 165 of the ball valve as the valve is moved upwardly through the tubing.

It will be seen that when the valve is removed ports 41 and 42 are closed by the auxiliary valve so that the weighted fluid or mud from the annulus above the packer cannot flow inwardly into the tubing and thus contaminate or kill the well by flowing downwardly into the tubing once the valve is removed.

If the valve is not removed after it has closed and it should be desired to reopen the valve after the tubing has been repaired in situ by plugging such leak thereof in any suitable manner, the pressure in the tubing above the valve is increased, as by pumping fluid thereinto at the surface. This increase in pressure does not move the piston downwardly until the auxiliary valve is moved downwardly to its lower open position because the incompressible liquid trapped beneath the piston flange of the piston in the compartment as long as the auxiliary valve is in its closed upper position, holds the piston in its upper position and thus the ball valve in its upper closed position until the auxiliary valve is moved by the increased force of the pressure in the tubing above the valve to its lower open position. The fluid pressure above the ball valve exerted across the area of the ball valve and of the piston defined by the line of sealing engagement of the O-ring 95 with the piston 87 and the force exerted on the piston flange by the charge of compressed gas in the compartment 99 move the piston and the ball valve downwardly, the ball valve rotating to its open position during such downward movement thereof in the mandrel.

If it should be desired to remove the valve 23 at a time when it is open and the auxiliary valve is in its lower open position, it may be moved to its closed position in order that the auxiliary valve may be moved to its upper closed position to prevent flow of the weighted liquid into the tubing when the valve is removed, by increasing the pressure in the annulus above the packer, as by pumping fluids thereinto at the surface. The valve may then be removed by pulling tool as described above.

It will now be seen that a new and improved well tool has been illustrated and described which includes a nipple 21 connectable in a string of tubing to constitute a section thereof, which has a port such as the port 41, and an auxiliary valve, such as the valve 35, for closing the port to prevent communication of the interior passage of the nipple with the exterior thereof through the port.

It will further be seen that the well tool includes a valve 23 which is removably positionable in the nipple and that the nipple and the valve have coengageable latch or lock means, such as the latch recess 57 and the dogs 77 for holding the valve against movement in the nipple.

It will further be seen that the valve includes a mandrel 60 having a ball valve 156 which is movable between closed and open positions for closing the flow passage of the mandrel and thus of the tubing or flow conductor and an operator means, such as the piston 87 which is biased by a suitable means, such as a charge of compressed gas in the upper compartment 99, toward a position holding the valve open, the valve having means, such as the ports 105 and the annular passage 106, by means of which the pressure from the annulus between the tubing and the well casing is communicated to the piston to bias it toward a position wherein the valve is closed and the valve is closed whenever the pressure in the annulus exteriorly of the tubing exceeds a value predetermined by the value of the gas in the upper compartment.

Referring now particularly to FIGURES 6, 7, 7A, 8 and 9 of the drawings, the well tool 220 has a modified nipple 221 in which the valve 23 is removably positionable. The nipple 221, like the nipple 21 of the well tool 20, has threaded end portions 222 by means of which it may be connected in a tubing to constitute a section thereof, an internal annular recess 225 in which are receivable the bosses 78 of the hooks of the dogs 77 of the valve 23 an internal upwardly facing stop shoulder 226 which is engageable with the stop shoulder 92 of the mandrel 60 of the valve 23 for limiting downward movement of the valve in the nipple 221, and upper and lower sealing surfaces 228 and 229 which are engageable by the upper and lower seal assemblies 83 and 110 of the valve. The nipple also has an intermediate port 230 which communicates with the port 105 of the valve 23, an upper port 231, which opens inwardly into the bore or longitudinal passage of the nipple above the upper seal surface 228, and a lower lateral port 232 which opens inwardly into the flow passage of the nipple below the lower seal assembly 110 of the valve.

The nipple has an external recess 235 in which is positioned the longitudinally extending elongate auxiliary valve housing 236 rigidly secured to the nipple as by welding. The lower end of the housing is closed by a plug 238 threaded therein. The upper end of the valve housing is rigidly secured to a lug 240 as by welding which lug in turn may be rigidly secured to the nipple by welding. The lug has a longitudinal bore 241 which opens into the upper end of the valve housing. An elongate tube 242 also welded to the exterior of the mandrel above the upper end of the mandrel recess 235 has its lower end rigidly secured to the lug by welding and the lower end of its passage 243 communicates with the upper end of the passage 241 of the lug. The upper end of the tube 241 is closed by a top lug 246 welded to the mandrel whose downwardly opening passage 248 communicates with the upper end of the passage 243 of the tube and whose lateral port 249 communicates with the nipple port 230 and the bore 248. Fluid pressure from the interior of the flow passage of the nipple above its upper sealing surface 228 is thus communicated to the upper end of the valve housing chamber 250 in which the auxiliary valve 252 is slidably disposed. The valve 252 is movable in the valve housing between a lower open position illustrated in FIGURE 7 and an upper closed position illustrated in FIGURES 8 and 9.

The valve housing has a lateral port 253 which communicates the lower end of the valve housing 250 with the lower port 232 of the mandrel so that the lower end of the chamber 250 is placed in communication with the interior of the flow passage of the nipple below its lower seal surface 229 which is engaged by the lower seal assembly 110 of the valve. The valve housing has an intermediate port 255 which is in alignment and communication with the intermediate port 230 of the nipple and a port 257 which opens to the exterior thereof and therefore to the annulus between the string of tubing and a well casing W above the packer closing such annulus in the same manner as the port 42 of the sleeve 24 of the nipple 21 illustrated in FIGURES 1 through 5.

The valve 252 has an external annular recess 260 which is positioned in alignment with the ports 257 and 255 and has a pair of longitudinally spaced O-rings 262 and 263 disposed in suitable external annular recesses thereof above and below its recess 260 which seal with the internal surfaces of the valve housing above and below the ports 255 and 257 when the valve is in its lower open position. The valve also has an O-ring 265 disposed in a suitable external recess thereof which seals with the internal surfaces of the valve housing between the ports 255 and 257 when the valve is in its upper closed position to prevent flow of fluids through the valve housing between the ports 255 and 257 thereof and a bottom O-ring 266 also disposed in a suitable annular external recess of the valve which prevents flow of fluids between its ports 255 and 253.

It will now be apparent that the mode of operation and function of the auxiliary valve 252 of the well tool 220 is identical with that of the auxiliary valve 35 of the well tool 20. The auxiliary valve 252 is initially in its upper closed position when the tubing in which the nipple 221 is connected is lowered into the well. The valve 23 is then lowered into and locked against longitudinal movement in the landing nipple 221 in exactly the same manner as it is lowered into and locked in the nipple 21 of the well tool 20. When the valve 23 is in its operative locked position in the landing nipple 221, the ports 105 of the mandrel 60 of the valve 23 are in communication with the lateral port 230 of the nipple 221 and its upper and lower seal assemblies 83 and 229 seal between the valve mandrel and the nipple above and below the ports 105 and 230. The external diameter of the port mandrel section 64 is of course somewhat smaller than the internal diameter of the landing nipple so that the fluids may flow from the port 230 into the ports 105 even though a particular port 105 of the valve mandrel may not be in exact alignment with the port 230 of the mandrel.

When the valve is properly positioned and locked in the mandrel 221, the auxiliary valve 252 is moved to its lower open position by positioning a plug such as the plug 175 in the valve mandrel and then increasing the pressure in the tubing at the surface, as by pumping thereinto until the pressure in the tubing above the valve communicated through the upper port 231 of the nipple, the port 249 and passage 248 of the upper lug 246, the passage 243 of the tube 242 and the passage 241 of the lower lug 240 into the upper end of the chamber 250 of the valve housing above the auxiliary valve exceeds the pressure in the tubing below the valve communicated through the lower port 232 of the mandrel and the port 253 to the lower end of the chamber below the auxiliary valve and moves the auxiliary valve downwardly to its lower open position.

The plug is then removed from the mandrel of the valve and flow of fluids can take place upwardly through the valve as long as the pressure in the upper compartment 99 of the valve exceeds the pressure in the annulus between the tubing and the well casing W above the packer such annulus pressure being communicated to the lower compartment 100 of the valve through the auxiliary valve housing port 257, the external recess 260 of the valve and the ports 255, 230 and 105 and the passage 106. The piston 87 of the valve will thus remain in its lower position holding the ball valve 156 in its open position as long as the upward force applied to the piston by pressure from exteriorly of the annulus does not exceed the downward force exerted thereon by the charge of compressed gas in the upper compartment 99.

Figure 8:
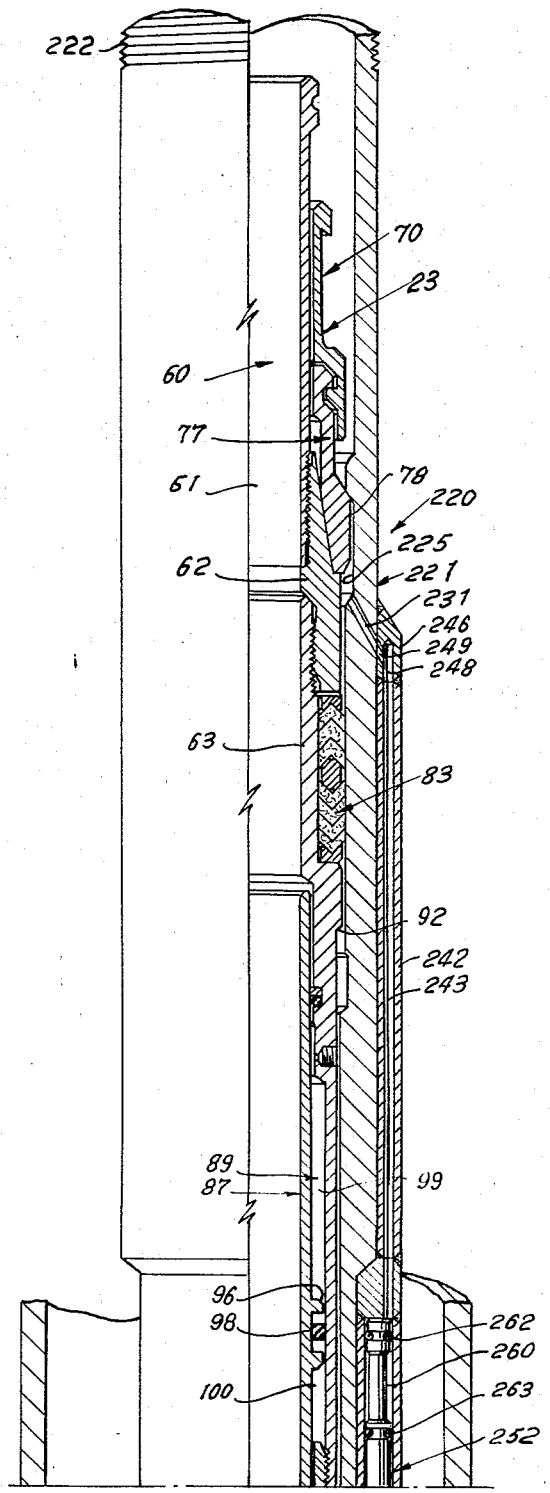
FIGURE 8 is a vertical, partly sectional view showing the upper portions of the well tool illustrated in FIGURES 6 and 7, and showing the elements thereof in the positions assumed thereby when the valve is in closed position.
Figure 9:
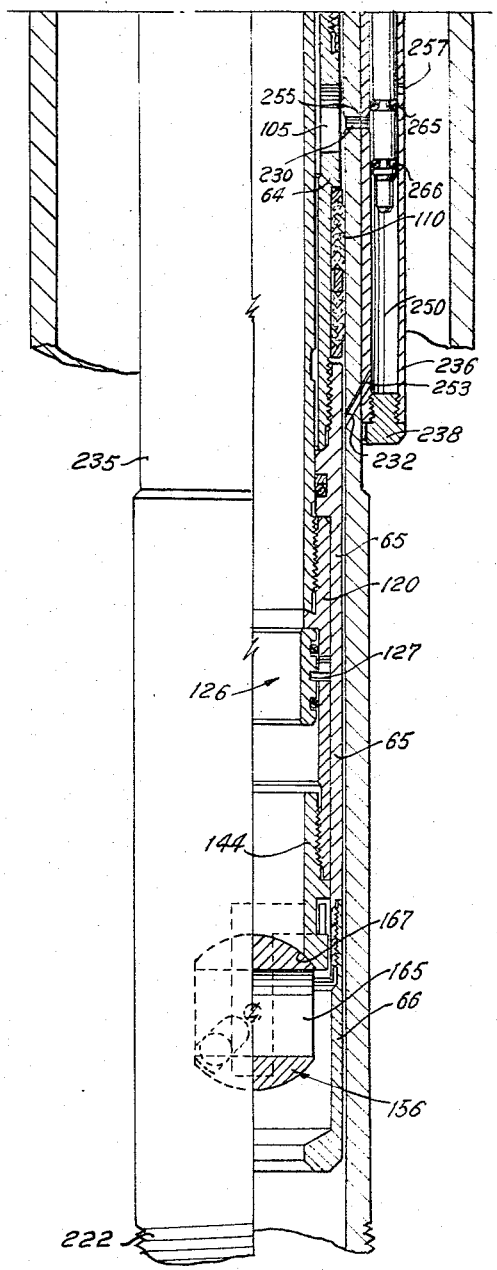
FIGURE 9 is a view similar to FIGURE 8, being a continuation thereof and showing the lower portions of the well tool.

When the pressure in the annulus above the packer increases so that the upward force exerted thereby on the piston exceeds the downward force exerted on the piston by the charge of compressed gas, the piston is moved upwardly and the ball valve is moved to the upper position as illustrated in FIGURES 8 and 9. Once the ball valve moves to its closed position, the flow passage of the tubing is closed and the continued flow of fluids form the upper end of the tubing at the surface through the well head connections causes the pressure in the tubing to decrease while the pressure below the tubing rises or remains at the pressure of the earth formation. The pressure in the upper end of the auxiliary valve housing, which is now in communication with the flow passage of the tubing above the closed valve 23 decreases and the pressure differential thus created across the auxiliary valve 252 now causes the auxiliary valve to move upwardly to its closed position. The valve 23 may be removed from the nipple 221 in the same manner as it is removable from the nipple 21 and, when it is removed, the auxiliary valve remains in its upper closed position being retained therein by its frictional engagement with its housing so that when the valve 23 is removed no mud can flow into the tubing to contaminate or kill the earth formation or kill the well.

The auxiliary valve 252 and the valve 23 may be moved to their open positions after the leak in the tubing has been repaired in any suitable manner by increasing the pressure in the annulus at the surface to move the auxiliary valve to its open position, since the valve piston 87 cannot move downwardly to move the ball valve 56 to its open position due to the incompressible fluid trapped beneath its flange 96 until the auxiliary valve 252 has been moved to the open position.

Immediately upon the valve 252 moving to its open position, the force of the pressure differential created across the piston and the closed ball valve by introduction of fluid under pressure into the tubing at the surface of the well and the force of the compressed gas in the upper compartment of the valve 23 are effective to move the piston downwardly and move the ball valve to its open position.

If it should be desired to remove the valve when it is in its open position, it is of course desirable to first move the valve 252 to its closed position which can be easily accomplished by increasing the pressure in the annulus above the packer, as by pumping fluids thereinto at the surface through the usual surface connections of the well whereupon the piston will move upwardly and move the ball valve to its closed position and the pressure differential thus created as the fluid in the tubing above the valve flows outwardly therefrom at the surface of the well moves the auxiliary valve 252 to its closed position. The valve 23 can then be removed in the same manner as described hereinabove from the nipple 21 of the well tool 20.

Referring now particularly to FIGURES 10, 10A, 11 and 12 of the drawing, the well tool 300 includes the valve 23 and a landing nipple 301 in which it is removably positionable. The nipple 301 includes a top section 302, intermediate section 303 whose upper end portion is threaded on the lower end portion of the top section and a bottom section 304 whose upper end portion is threaded into the lower end portion of the intermediate section. The extreme outer end portions of the top and bottom sections, not shown, are threaded so that the nipple may be connected in a tubing to constitute a section thereof in the same manner as the nipples 21 and 221 of the well tools 20 and 220. A tubular auxiliary valve 306 is disposed in the nipple for limited longitudinal movement therein between the lower open position illustrated in FIGURES 10 and 12 wherein the downward movement of the auxiliary valve is limited by the engagement of the downwardly facing annular shoulder 307 of the valve with the upwardly facing annular internal shoulder 308 of the nipple bottom section and an upper closed position wherein the top annular end surface 310 of the auxiliary valve engages the downwardly facing annular shoulder 311 of the top mandrel section 302.

The intermediate nipple section has a plurality of circumferentially spaced lateral ports 312 which communicate with the circumferentially spaced ports 314 of the auxiliary valve when it is in its open position. The nipple has upper and lower seal assemblies 315 and 316 above and below its ports 312 for sealingly engaging the external surface of the auxiliary or nipple valve 306 and seal therebetween. Downward movement of the upper seal assembly is limited by the upwardly facing internal annular shoulder 318 of the intermediate nipple section and its upward movement is limited by the downwardly facing annular end shoulder 319 of the top nipple section. The lower seal assembly is similarly mounted on the intermediate port section of the nipple, its upward movement on the mandrel being limited by the annular downwardly facing shoulder 320 of the intermediate nipple section and its downward movement of the mandrel being limited by the upwardly facing annular end shoulder 321 of the bottom nipple section. The O-rings 323 and 324 disposed in suitable external annular recesses of the top and bottom nipple sections seal between these sections and the intermediate nipple sections above and below, respectively, the upper and lower seal assemblies. The internal diameter of the nipple above the shoulder 307 of the bottom nipple section is somewhat greater than the external diameter of the auxiliary valve so that the valve ports 314 are in fluid communication with the nipple ports 312 even when not circumferentially aligned therewith. The auxiliary valve 306 has an upper section 325 provided adjacent its upper end with an annular internal latch recess 327 in which are receivable the bosses 78 of the dogs 77 of the valve 23 and with an internal upwardly facing annular stop shoulder 328 which is engageable with the downwardly facing external annular shoulder 92 of the valve mandrel 60 for limited downward movement of the valve in the mandrel. The auxiliary valve also includes a collet section 330, whose upper end portion is threaded into the lower end portion of the upper section, and has a plurality of circumferentially spaced longitudinally extending slots 332 adjacent its lower end which define the spaced resilient collet strips 333 each of which has an external boss 334 intermediate its ends. The collet bosses are receivable in the lower and upper internal annular latch recesses 336 and 337, respectively, of the bottom nipple section 304 for releasably restraining movement of the auxiliary valve from one position toward the other. The collet bosses 334 have outwardly convergent upper and lower shoulders which are engageable with the inwardly divergent upper and lower shoulders defining the latch recesses and the latch strips or members being resilient, the bosses are moved inwardly by the camming engagement of their upper shoulders with the upper shoulder of the lower latch recess 334 when a predetermined upward force is exerted on the auxiliary valve to move it from its lower open to its upper closed position. The bosses are similarly moved inwardly by the camming engagement of their lower shoulders with the lower shoulder of the upper latch recess to permit downward movement of the auxiliary valve from its upper closed position in the nipple to its lower open position, illustrated in FIGURES 10 and 11, when a predetermined downward force is exerted on the auxiliary valve.

The well tool 300 functions in substantially the same manner as the well tool 20 and the valve 23 is positionable and removable from the auxiliary valve 306 of the nipple 301 in the same manner it is positionable and removable from the nipple 21 of the well tool 20 illustrated in FIGURES 1 through 5.

In use, the nipple 301 is connected in a tubing to form a section thereof by means of the usual collars and its auxiliary valve 306 is initially positioned in its upper closed position with the collet bosses 334 thereof disposed in the upper latch recess 337 of the bottom nipple 304. The collet section thus releasably holds the auxiliary valve in its upper position in the nipple wherein its ports 314 are disposed above the upper seal assembly 315 of the nipple so that no fluids can flow from the exterior of the nipple into the tubing through the ports 314 of the auxiliary valve. After the string of tubing has been properly positioned in the well casing W, the packer is moved to its sealing position closing the annulus between the tubing and well casing at some position below the nipple 301. The valve 23 may be moved downwardly into the well in the manner described and when the stop shoulder 92 of its mandrel 60 engages the stop shoulder 328 of the auxiliary valve 306, downward jars imparted to the running tool, of the type described above, to the valve mandrel and thus to the auxiliary valve move the auxiliary valve downwardly, the collet bosses 334 camming the collet fingers resiliently inwardly to permit such downward movement of the auxiliary valve.

When downward movement of the auxiliary valve is arrested by the engagement of its downwardly facing annular stop shoulder 307 with the upwardly facing stop shoulder 308 of the lower nipple section, the collet bosses 334 are positioned in the lower latch recess 336 of the bottom nipple section 304 and releasably hold the auxiliary valve in its lower open position in the mandrel. The dogs of the running tool are also now disengaged from the undercut shoulder 71a of the dog carrier 70 of the valve and upward movement then imparted to the running tool causes the valve mandrel to move upwardly relative to the dogs 77. Camming engagement of the expander surface 79 with the cam surfaces 80 of the dogs during upward movement of the mandrel moves then into fully expanded positions in the latch recess 327 of the auxiliary valve. Further upward jars then imparted to the running tool cause it to be released from the mandrel, the shear pin or other means which secure such running tool to the mandrel requiring a smaller force to cause them to shear or fail than the force required to cam the bosses 334 of the collet strips 333 inwardly from the lower latch recess 336.

On release of the running tool from the valve mandrel, it is removed upwardly from the well tool leaving the valve 23 in the position illustrated in FIGURES 10 and 11 with the valve 156 thereof in its open position, being held therein by the force exerted on the valve piston by the charge of compressed air in the upper compartment 99 of the valve. The pressure from the annulus above the packer is now communicated to the lower compartment 100 and exerts an upward force on the piston. Should the pressure in the annulus at the valve now increase for some reason, it moves the valve piston upwardly and the ball valve 156 to its closed position. Once the ball valve is in its closed position, an upward pressure differential develops across the assembly of the valve 23 and the valve 23 since the pressure in the tubing above the valve 23 decreases as fluid flows therefrom at the surface and the auxiliary valve carrying the valve 23 therewith, moves to its upper closed position, the pressure differential being sufficiently great to cause the collet strips to move resiliently inwardly as their bosses are cammed inwardly and out of the lower latch recess 336 until upward movement of the auxiliary valve is stopped by the engagement of its stop shoulder 310 with the downwardly facing stop shoulder 311 of the nipple. In this position, the collet bosses 334 are disposed in the upper collet recess 337 and releasably hold the auxiliary valve against downward movement.

It will thus be apparent that once the valve 23 moves to its closed position, its operator member or piston is shielded from the pressure of the fluid in the annulus above the packer since the auxiliary valve is moved to a position wherein its ports 314 are disposed above the upper seal assembly 315 of the mandrel and therefore out of communication with the ports 312 thereof. The valve will now remain in its closed position and the valve in its closed position since incompressible fluid is trapped in its lower compartment 100 until the auxiliary valve is moved to its lower open position to permit escape of the trapped fluid.

When it is again desired to move the valve 23 to its open position, as after the tubing has been repaired or plugged, the pressure in the tubing above the valve is increased as by pumping fluids into the upper end thereof at the surface. When the pressure in the tubing above the valve exceeds the pressure below the valve to the degree necessary to release the collet bosses 33 from the upper latch recess 337, the assembly of the auxiliary valve and the valve 23 will move downwardly in the nipple until it assumes the position illustrated in FIGURES 10 and 11. As the ports 314 of the auxiliary valve move into communication with the ports 312, the incompressible liquid trapped in the lower compartment 100 of the valve can escape therethrough. The force exerted by such increased pressure differential on the closed ball valve, as well as the force exerted by the compressed gas in the upper compartment 99 of the valve, moves the piston downwardly in the valve mandrel and causes the valve to be moved to its open position.

It will also be apparent that the valve can be removed from the nipple 301 in a similar manner and by the use of a similar pulling tool as it may be removed from the nipple 21 of the well tool 20 as previously described.

The well tool 400 illustrated in FIGURES 13 and 14 includes a nipple 401 having the usual threaded end portions, not shown, so that it may be connected by the usual tubing collars in a tubing to constitute a section thereof and in which is receivable the removably positionable valve 23. The nipple has an internal annular dog recess 402 in which are receivable the bosses 78 of the dogs 77 of the valve 23, an inner upwardly facing annular stop shoulder 404 engageable with the shoulder 92 of the valve mandrel 60 to limit downward movement of the valve 23 in the nipple, and upper and lower seal surfaces 406 and 407 which are engageable by the seal assemblies 83 and 110 of the valve mandrel for sealing therebetween above and below the ports 105 of the valve mandrel and the lateral bore or ports 409 of the nipple. The lateral port 409 of the nipple communicates with the lower end of the chamber 411 of the tubular auxiliary valve housing 412 through the fitting 414 one of whose ends is threaded in the bore 409, the tube 415 whose lower end is connected to the fitting 414, the fitting 416 which is connected to the conduit 415 and threaded in the longitudinal bore 418 of the lower bottom closure 420 threaded in the lower end of the valve housing 412. The bore 418 opens to the lower end of the valve chamber 411. The upper end of the auxiliary valve housing is closed by a suitable closure 422.

The auxiliary valve housing 412 extends longitudinally of the nipple and is rigidly secured thereto as by welding. The housing has a lateral port 424 adjacent its upper end through which the pressure from the annulus between the tubing in which the nipple is connected and the well casing above a packer closing such annulus is communicated to the upper end of the chamber 411. The tubular auxiliary valve 426 is longitudinally movable in the valve housing and includes an elongate tubular main body 427 having a lower annular external flange 428 which limits downward movement of a lower tubular seal carrier 430 telescoped thereon. A bottom seal assembly 432 is mounted on the lower end portion of the seal carrier and its downward movement on the valve is limited by the engagement of its lower end with the top surface of the external flange of the body and its upward movement is limited by the engagement of its upper end with the downwardly facing annular shoulder 434 of the carrier. An intermediate seal assembly 438 is mounted on the upper end portion of the lower seal carrier and its downward movement thereon is limited by the engagement of its lower end with the upwardly facing annular shoulder 439 of the lower seal carrier and upward movement thereof is limited by the engagement of its upper end with the lower annular end surface 439 of an upper seal carrier 440 also telescoped on the main body and held thereon by a nut 442 threaded on the upper end of the main body. The upper seal carrier has a seal assembly 444 on its upper end portion whose downward movement on the upper seal carrier is limited by the engagement of its lower end with the upwardly facing annular shoulder 445 of the upper seal carrier and whose upward movement on the slip carrier is limited by the engagement of its upper end with the lower annular end surface of the nut 442. O-rings 448 and 449 are disposed in suitable external annular recesses of the main body for sealing between the body and the lower seal carrier above and below the lateral bore 451 of the lower slip carrier. An O-ring 452 is similarly disposed in an external annular recess of the body and seals between the body and the upper seal carrier 440.

When in its lower open position illustrated in FIGURE 13, the auxiliary valve 426 permits communication of the pressure from exteriorly of the nipple to the lower compartment 100 below the piston flange 96 of the valve piston 87 through the port 424 of the valve housing, the upper end of the chamber 441, the longitudinal passage 455 of the body 427 of the auxiliary valve, the passage 418 of the bottom closure 420, the tube 415, the fitting 417, the port 409 of the nipple, the ports 105 of the valve and the passage 106 between the piston and the valve mandrel. When the auxiliary valve is in its upper position, it prevents communication of the pressure from the exterior of the nipple to the lower compartment 100 since its upper and intermediate seal assemblies are disposed above and below the port 424 and the auxiliary valve thus closes the port 424.

The auxiliary valve is movable between its upper and lower positions by an operator sleeve 460 mounted in an internal annular recess 461 of the nipple between a lower position wherein its downward movement is limited by the engagement of its lower annular end 462 with the annular upwardly facing stop shoulder 463 defining the lower end of the recess and an upper position wherein its upward movement is limited by the engagement of its upper end surface 466 with the stop shoulder 467 defining the upper end of the nipple recess. The nipple has annular cam shoulders 468 and 469 extending inwardly from the edges of the annular stop shoulders 463 and 466, respectively.

The sleeve 460 has a connector pin or lug 470 rigidly secured thereto which extends laterally and inwardly through the aligned longitudinal slots 471 and 472 of the nipple 401 and the valve housing into the aperture or bore 451 of the lower seal carrier of the auxiliary valve so that the auxiliary valve 426 is moved upwardly and downwardly upon upward and downward movement of the control sleeve in the internal recess 461 of the mandrel. The lower and intermediate seal assemblies 432 and 438 are disposed on opposite sides of the longitudinal slots 472 of the valve housing and prevent any flow of fluids between the valve housing chamber 411 and the internal bore or passage of the nipple.

It will be apparent that when the valve is in its upper position wherein its top shoulder 466 engages the shoulder 467, the upper and intermediate seal assemblies 444 and 438 of the auxiliary valve are disposed on opposite sides of the upper externally opening lateral port 424 of the valve housing and thus prevent communication of pressure from exteriorly of the valve housing and the nipple to the lower compartment 100 of the valve 23 beneath the valve piston flange 96 and that when the control sleeve is in its lower position in the recess 461 of the nipple wherein its lower shoulder 462 is in engagement with the upwardly facing shoulder 463, the top seal assembly 444 of the auxiliary valve is positioned below the port 424 and thus the pressure from the exterior of the valve housing and the nipple is communicated to the lower compartment 100 to bias the valve piston 87 towards it upper position.

The control sleeve 460 has a lower internal key or recess 475 which provides an upwardly facing abrupt shoulder 476 and an upwardly and inwardly extending cam shoulder 477 and an upper key recess 480 of substantially the same configuration which provides an abrupt downwardly facing annular shoulder 481 and an inwardly and downwardly extending cam shoulder 482. The control sleeve at the upper key recess 480 has a plurality of longitudinal slots 484 which provide resilient flexible collet sections 487, each having an external boss 88. The collet bosses have outwardly convergent upper and lower shoulders. The collet bosses 488 are receivable in the internal longitudinally spaced annular latch recesses 490 and 491 of the nipple. The cam bosses are disposed in the lower latch recess when the control sleeve is in the lowermost position illustrated in FIGURE 1 and releasably hold the sleeve in its lower position until a predetermined force is exerted on the control sleeve and causes camming engagement of the downwardly and outwardly extending upper shoulders of the cam bosses with the downwardly and outwardly extending upper shoulder of the latch recess 490 to move the bosses inwardly, the collet sections flexing resiliently, and thus permit the control sleeve to move upwardly in the nipple. The bosses 488 when in the upper latch recess similarly releasably hold the control sleeve in its upper position. The camming engagement between the upwardly and outwardly extending lower shoulders of the bosses with the similarly downwardly and outwardly inclined lower shoulder defining the lower end of the cam boss top recess 491 when the control sleeve is urged downwardly by a predetermined force moves the bosses out of the recess and thus permits the movement of the sleeve downwardly to its lower closed position.

The sleeve is movable between its upper and lower positions by any suitable running tool, as for example, the running tool disclosed in the patent to Grimmer et al., No. 3,051,243, August 28, 1962, which has keys receivable in the key recesses of the control sleeve and provided with shoulders engageable with the upwardly facing shoulder 476 of the control sleeve when it is desired to move the control sleeve from its upper position to its lower position and engageable with the downwardly facing shoulder 481 of the sleeve for moving the control sleeve from its lower to its upper position.

In use, the nipple 400 is connected in a tubing in the same manner as the other nipples by means of the usual tubing collars with its control sleeve in its upper position wherein it is releasably held by the engagement of the collet bosses 488 in the latch recess 491 of the nipple and with the auxiliary valve 426 therefore in its upper position so that no fluid may flow into the nipple through the auxiliary valve housing and the duct 415. When the tubing has been properly positioned in the well casing, the packer moved into operative position closing the annulus between the tubing and the well casing below the nipple and the annulus between the tubing and the well casing above the packer filled with the weighted liquid to equalize the pressure acting across the packer and between the exterior and the interior of the well casing throughout the length thereof in the customary manner, the valve 23 is lowered into the tubing and into the mandrel 400 in the manner described until it is properly positioned in the mandrel and held against upward movement therein by the dogs 77 whose bosses 78 are disposed in the latch recess 402 of the nipple and against downward movement by the engagement of the valve mandrel stop shoulder 92 with the nipple stop shoulder 404. The valve 156 is then held in its open position by the charge of compressed gas in the upper compartment 99 of the valve and the ports 105 of the valve mandrel are in communication with the port 409 of the nipple and therefore in communication with the lower end of the chamber 411 of the auxiliary valve housing 410. The running tool is then released from the valve mandrel and removed from the tubing. A shifting tool such as the tool described and illustrated in the patent to Grimmer et al., 3,051,243, is then lowered through the well tubing by means of the usual flexible line tools and flexible line until its keys are positioned in the lower key recess 475 of the control sleeve and engage the shoulder 476 whereupon downward jars imparted to the shifting tool move the sleeve downwardly into the nipple, the bosses 488 camming out of the upper recess 491 to permit such downward movement of the control sleeve, until the control sleeve is moved to its lower position illustrated in FIGURE 14 wherein its downwardly facing lower end shoulder 462 engages the shoulder 463 of the nipple and collet bosses 488 are disposed in the lower latch recess 490. The auxiliary valve 426 is of course shifted to its upper position to its lower open position. The shifting tool is then removed from the well.

The pressure from the annulus above the packer is now communicated to the lower compartment 106 in the manner described above and if such pressure increases to the valve which exerts an upward force on the piston flange 96 which exceeds the downward force exerted thereon by the charge of compressed gas in the upper compartment 99 of the valve, the piston is moved upwardly and the ball valve 156 is moved to its closed position.

If it is then desired to remove the valve 23 from the tubing, the shifting tool is again lowered in the tubing until its keys are received in the upper key recess 480 of the control sleeve and engage the downwardly facing abrupt shoulder 481 of the sleeve so that an upward force or jars imparted to the shifting tool move the control sleeve upwardly to its upper position thus moving the auxiliary valve to its upper closed position whereupon the keys of the dogs engage the release cam surface 469 of the nipple and are moved out of engagement with the downwardly facing shoulder 481 of the control sleeve. The keys of the shifting tool are thus released from engagement with the control sleeve once it is in its upper position and the shifting tool can then be removed upwardly through the tubing. A pulling tool is then lowered into the tubing to engage the valve and remove it in the manner described in connection with the well tool 20. If it is desired to reopen the valve 23 after it has closed, the pressure in the tubing above the valve is increased until it exceeds the pressure in the tubing below the valve whereupon the piston will be moved downwardly and the ball valve will rotate to its open position. It will thus be apparent that the well tool 400 functions in substantially the same manner as the previously described forms of the well tool to close the flow passage of a string of tubing in which the nipple of the well tool is connected whenever the pressure in the annulus between such tubing and the well casing in which it is located above a packer closing the annulus exceeds a predetermined value. It will further be seen that the auxiliary valve is movable not by a pressure differential but by a suitable shifting tool lowered into the tubing.

The well tool 500 illustrated in FIGURES 15, 16 and 17 includes the valve 23 and a landing nipple 501 of still another modified form. The landing nipple 501 has externally threaded opposite end portions 502 by means of which it may be connected in a tubing by the usual tubing couplings or collars to constitute a section of the tubing. The nipple 501 has a top section 504, a seal section 505 whose upper end portion is threaded on the lower end portion of the top nipple section, a port section 506 whose upper end portion is threaded in the lower end portion of the seal nipple section and a bottom section 507 whose upper end portion is threaded in the lower end portion of the port nipple section.

The nipple has an internal upper seal assembly 510 sealing the nipple and a tubular sleeve or auxiliary valve 512 by engaging the upper seal surface 513 of the sleeve valve above the lateral ports 514 of the seal nipple section 505. The seal assembly 510 is disposed in the upwardly opening internal recess 515 of the seal nipple section.

Its downward movement on the nipple is limited by the engagement of its lower end with the upper facing annular shoulder 516 of the seal nipple section and its upward movement is limited by the engagement of its upper end surface with the downwardly facing annular end shoulder or surface 517 of the top nipple section. An intermediate internal seal assembly 521 of the nipple is disposed in the downwardly opening end recess 522 of the seal nipple section. Its upward movement in the seal nipple section is limited by the engagement of its upper end surface with the downwardly facing annular shoulder 524 of the seal nipple section and its downward movement in the lower end recess is limited by the engagement of its lower end surface with the upwardly facing end surface or shoulder 525 of the port nipple section 506. The intermediate seal assembly 521 engages the lower seal surface 527 of the sleeve valve when the sleeve valve is in an upper position in the nipple as will be described below to seal between the nipple and the sleeve between the upper ports 514 of the seal nipple section and the lower ports 528 of the port nipple section 506. The inner ends of the ports 528 communicate with an internal annular recess 530 of the port nipple section which communicates with the external longitudinal groove or passage 532 of the sliding sleeve whose upper end communicates with the annular passage 534 between the sleeve valve and the seal section of the nipple between the upper and intermediate seal assemblies 510 and 521, into which the upper nipple ports 514 open.

The port nipple section 506 has a downwardly opening end recess 536 below the ports 528 in which is disposed the lower seal assembly 537 which engages the lower seal surface 527 of the sliding sleeve to seal between the nipple and the sleeve valve. Upward movement of the lower seal assembly on the port nipple section is limited by the engagement of its upper end surface with the downwardly facing annular shoulder 538 of the port nipple section and its downward movement is limited by the engagement of its lower end surface with the upwardly facing end shoulder or surface 539 of the bottom nipple section 109. O-rings 540 are disposed in suitable external annular recesses of the nipple sections to seal between the nipple sections at the locations of their connections to one another.

An annular passage 541 whose upper end communicates with the intermediate ports 528 of the nipple and whose lower end communicates with the lower lateral ports 543 in the bottom nipple section is provided by a passage sleeve 544 disposed about the nipple. The lower end of the annular passage is closed by an annular plug or closure 546 rigidly secured to the bottom nipple section below the ports 543 and to the lower end of the passage sleeve by welding. The upper end portions of the sleeve extends about the port nipple section and is provided with a seal retainer nut 550 threaded in its upper end whose lower internal bottom end surface or shoulder 551 limits upward movement of a seal assembly 553 disposed between the passage sleeve and the seal nipple section which closes the upper end of the annular passage 541 above the intermediate nipple ports 528. Downward movement of the seal assembly 553 on the seal nipple section is limited by the engagement of its lower end surface or shoulder with the upwardly facing annular stop shoulder 555 provided by a suitable external annular flange 556 of the port nipple section 506.

The sleeve valve 512 is longitudinally movable in the internal recess 558 of the nipple and, like the control sleeve 460 of the well tool 400, has lower and upper key recesses 560 and 561 providing abrupt upwardly and downwardly facing shoulders 562 and 563, respectively, which are engageable by the keys of a shifting tool, such as the shifting tool disclosed in the patent to Grimmer, 3,051,243, whereby the sleeve valve may be moved by such shifting tool between its lower open position in the manner illustrated in FIGURES 15 and 16, wherein its downward movement in the nipple is limited by the engagement of its bottom end surface 564 with the upwardly facing internal annular shoulder 565 of the bottom nipple section 507 defining the lower end of the nipple recess 558 and an upper closed position wherein its upward movement is limited by the engagement of its top end surface 568 with the internal downwardly facing annular shoulder 569 of the top nipple section defining the upper end of the nipple recess 558. The nipple has lower and upper internal annular key cam surfaces 570 and 571 which engage the keys of a shifting tool to move the keys out of engagement with the abrupt shoulders 562 and 563, respectively, of the sleeve valve, when the sleeve has been moved by the shifting tool to its lower or upper position, and thus release the shifting tool for downward or upward movement out of the sleeve valve. The sleeve valve at the upper key recess 561 has a plurality of longitudinal slots 572 which provide resilient flexible collet sections 573 each having an external boss 574 provided with outwardly convergent upper and lower shoulders. The collet bosses are receivable in lower and upper internal latch recesses 575 and 576 of the top nipple section for releasably holding the sleeve valve in its lower and upper positions in the nipple recess 558.

When the sleeve valve is in the lower position illustrated in FIGURE 15, the longitudinal groove or recess 522 of the sleeve valve communicates at its upper end with the annular passage 534 and this with the external ports 514 of the nipple and at its lower end communicates with the recess 530 and the ports 528 of the nipple and thus with the upper end of the annular passage 541. The pressure of the fluid from the exterior of the nipple is then communicated through the annular passage 541 and the nipple ports 543 to the interior of the nipple between the upper and lower internal seal surfaces of the bottom nipple section which are engageable by the upper and lower seal assemblies 83 and 110 of the valve 23.

The bottom nipple section has an internal annular dog or latch recess 585 in which are receivable the bosses 78 of the dogs 77 of the valve 23 and with an annular upwardly facing stop shoulder 586 which is engageable with the downwardly facing stop shoulder 92 of the valve mandrel so that the valve is releasably positionable in the nipple with its ports 105 positioned in alignment with and in communication with the lower ports 543 so that the pressure of the fluid in the passage from the exterior is communicated to the lower compartment 100 of the valve 23 and biases the piston 87 of the valve 23 upwardly when the sleeve valve is in its lower position illustrated in the drawing.

In use, the nipple 501 is connected in the tubing to constitute a section thereof by means of the usual tubing collars and is lowered into the well casing with its sleeve valve in its upper position wherein the intermediate seal assembly 521 sealingly engages the lower seal surface 527 of the sleeve valve below the longitudinal groove 523 and the upper seal assembly 510 engages the upper seal surface 513 of the sleeve valve above the ports 514 so that the ports 514 are closed by the sleeve valve and no fluid may flow from the exterior of the nipple into the interior thereof. When the tubing has been properly positioned in the well casing, the packer set to close the annulus between the tubing and the casing below the nipple, and the weighted liquid introduced into the annulus above the packer, the valve 23 is lowered into the well by means of a suitable running tool, as described above, and releasably latched in the nipple in the position illustrated in FIGURES 16 and 17 of the drawing, whereupon the running tool is removed upwardly from the tubing. A suitable shifting tool, such as the shifting tool described in the patent to Grimmer et al., 3,051,243, is lowered through the tubing into the nipple until its keys are in the lower key recess 560 of the sleeve valve. Downward jars imparted to such shifting tool, whose force is sufficient to cause the resilient collets sections 573 to be flexed inwardly and the bosses 574 to move out of the upper latch recess 576 due to the camming action of the lower shoulders of the collet bosses with the lower shoulder of the upper latch recess 570, move the sleeve valve to its lower open position illustrated in FIGURES 15 and 16 of the drawing. When the sleeve is moved to its lower position, the upper nipple ports 514 are placed in communication with the intermediate and lower nipple ports and thus the pressure of the fluid from the annulus above the packer is communicated to the ports 105 of the valve mandrel 60 and thus to lower compartment 100 of the valve to bias the valve piston 87 upwardly.

Should the pressure of the weighted liquid now increase for some reason, as the occurrence of a leak in the tubing above the valve, the force of the pressure from within the tubing added to the force of the hydrastatic pressure of the column of weighted liquid or mud causes the valve to move to its closed position as previously described. If it is then desired to remove the valve from the nipple, the shifting tool is again lowered until its keys enter into the upper valve sleeve recess 561 and engage the downwardly facing abrupt shoulder 569 and upward movement then imparted to the shifting tool moves the valve sleeve to its upper closed position and the ports 514 are thus closed. The shifting tool is then removed upwardly from the tubing and a suitable pulling tool is lowered into the tubing to engage the valve 23 and removed it upwardly as previously described. Since the sleeve valve is now in its upper closed position, the removal of the valve will not permit flow of the weighted liquid through the nipple into the tubing since the sleeve valve prevents any flow of fluids through the ports 514 of the nipple when in its upper closed position.

It will now be apparent that the well tools 400 and 500 have nipples provided with movable means for controlling communication between the interior passage of the nipple and the exterior thereof and that such movable means are movable by flexible line well tools lowered into the tubing which give a positive indication when such movable means are moved to permit or prevent such communication and that the use of such flexible line operate well tools permits the application of great forces to such movable means as the control sleeve and the sleeve and does not require the use of additional equipment such as pump which may be required to move the auxiliary valves of the well tools 20, 200 and 300.

It will also be apparent that while the operation of the control sleeve and the sleeve valve of the well tools 400 and 500 has been described as being by the use of a shifting tool which is run in to shift such control sleeve and sleeve valve and then removed from the well tubing after the valve 23 has been installed or before it is removed from the nipple, the shifting and running tools may be connected in the same string of flexible line well tools if desired so that the valve 23 can be lowered and set in the nipple and the control sleeve or sleeve valve then moved to its open position by a single trip of such well tools in the tubing and that similarly the pulling tool and the shifting tool may also be connected in the same string of the usual flexible line tool so that the sleeve valve or control sleeve may be moved to its closed position and the valve removed by a single trip of such well tools into the tubing.

While the valve 23 has been described in all embodiments of the tool as having a ball valve 156 which is connected to the lower end of its piston, it will be apparent that other forms of valves may be employed for this purpose. For example, a poppet type valve 600 may be connected to the lower end of the equalizing port section 144 of the piston instead of the ball valve 156. The poppet valve has an annular seat 602 engageable with the seat 603 of the annular seat member 605 threaded on the lower end of the connector mandrel section 65 in place of the housing mandrel section 66.

It will be apparent that when the piston is moved to its upper position in the valve mandrel 60, the engagement of the seats 602 and 603 closes the ports 605 of the poppet valve and thus closes the valve mandrel to flow of fluids therethrough.

It will also be apparent that while the illustrated and described valve 23 is responsive solely to the pressure of the annulus, it can be easily modified to be responsive to the pressure differential between the annulus and the interior or flow passage of the tubing by providing a port 610, indicated in broken lines in FIGURE 17, in the top piston section 93 above the piston flange 96. The upper compartment 99 would then not contain a charge of compressed gas. The piston would then be in its open lower position as long as the pressure in the nipple exceeded the pressure in the annulus and would be moved to its upper closed position whenever the pressure in the annulus exceeded the pressure in the nipple.

It will now be seen that all forms of the well tool embodying the invention include a nipple connectable in a string of tubing to constitute a section thereof, above a packer closing the annulus between the tubing and the casing, having a lateral port communicating the longitudinal bore of the nipple with the exterior thereof and having an auxiliary valve movable relative to the mandrel between a closed position closing the lateral port and an open position wherein the lateral port is open, and a valve removably positionable in the nipple, the valve having a mandrel provided with a valve means, such as the ball valve 156 for closing the longitudinal bore of the mandrel and therefore of the tubing, operator means for moving the valve means to closed position, and a port in the mandrel in communication with the exterior of the nipple through the lateral port of the nipple when the nipple or auxiliary valve is in its closed position for exposing the operator means to the pressure in the annulus above the packer whereby the operator means moves the valve means to closed position when such pressure exceeds a predetermined value.

It will also be apparent that in the well tools 20, 220 and 300 the auxiliary valve, when the valve means is closed, is exposed to the pressure in the tubing above and below the valve 23 and is moved by the upwardly acting pressure differential to its closed position.

It will also be apparent that in the well tools 400 and 500 the auxiliary valve is movable between its open and closed positions by a suitable shifting tool lowered through the tubing.

It will also be apparent that in the well tools 20 and 220, the auxiliary valve is movably held in either of its positions by the frictional engagement thereof with the means of the nipple in which it is mounted while in the well tools 300, 400 and 500 the nipple or auxiliary valve and the nipple have a coengageable means for releasably holding the nipple valve in its closed and open positions.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A well tool including: a tubular member connectable in a flow conductor to constitute a section thereof, said tubular member having a flow passage therethrough and a port intermediate the ends thereof communicating the exterior of the tubular member and said flow passage; an auxiliary valve movably carried by said tubular member and movable relative thereto between a first position wherein said port is open and a second position wherein said auxiliary valve closes said port; and a valve for closing said flow passage of said tubular member including a mandrel having a flow passage therethrough, valve means for closing said flow passage of said mandrel and operator means for moving said valve means between open and closed positions, said mandrel and said tubular member having co-engageable means for releasably holding said mandrel in a predetermined position in said tubular member, said operator means being exposed to the pressure from the exterior of said tubular member when said mandrel is in said predetermined position in said tubular member and said auxiliary valve means of said tubular member is in said open position and is responsive to said pressure for moving the valve means to closed position.

2. A well tool including: a tubular member connectable in a flow conductor to constitute a section thereof, said tubular member having a flow passage therethrough and a port intermediate the ends thereof communicating the exterior of the tubular member and said flow passage; an auxiliary valve movably carried by said tubular member and movable relative thereto between a first position wherein said port is open and a second position wherein said auxiliary valve closes said port; and a valve for closing said flow passage of said tubular member including a mandrel having a flow passage therethrough, valve means for closing said flow passage of said mandrel, and operator means for moving said valve means between open and closed positions, said valve having means biasing said operator means to position holding said valve means in open position, said mandrel and said tubular member having co-engageable means for releasably holding said mandrel in a predetermined position in said tubular member, said operator means being exposed to the pressure from the exterior of said tubular member when said mandrel is in said predetermined position in said tubular member and said auxiliary valve means of said tubular member is in said open position and is responsive to said pressure for moving the valve means to closed position.

3. A well tool including: a tubular member connectable in a well tubing to constitute a section thereof, said tubular member having a longitudinal flow passage and a port intermediate the ends thereof communicating said flow passage to the annulus between the tubing and a well casing in which the tubing is positionable above a packer closing the annulus; an auxiliary valve carried by said tubular member for closing said lateral port; and a valve removably positionable in a predetermined position in said tubular member for closing the flow passage of said tubular member, said valve having operator means for moving said valve to closed position exposed to the pressure of the annulus through said lateral port of said tubular member and responsive to said pressure when said valve is in said predetermined position.

4. A well tool including: a tubular member connectable in a flow conductor to constitute a section thereof, said tubular member having a flow passage therethrough and a port intermediate the ends thereof communicating the exterior of the tubular member and said flow passage; an auxiliary valve movably carried by said tubular member and movable relative thereto between a first position wherein said port is open and a second position wherein said auxiliary valve closes said port; and a valve for closing said flow passage of said tubular member including a mandrel having a flow passage therethrough, valve means for closing said flow passage of said mandrel, and operator means for moving said valve means between open and closed positions, said valve having means biasing said operator means to position holding said valve means in open position, said mandrel and said tubular member having co-engageable means for releasably holding said mandrel in a predetermined position in said tubular member, said mandrel having a port communicating with said port of said tubular member when said mandrel is in said predetermined position in said tubular member, said well tool having seal means sealing between said mandrel and said tubular member above and below said lateral ports when said mandrel is in said predetermined position, said operator means being exposed to the pressure from the exterior of said tubular member when said mandrel is in said predetermined position in said tubular member and said auxiliary valve means of said tubular member is in said open position and is responsive to said pressure for moving the valve means to closed position.

5. A well tool including: a tubular member connectable in a flow conductor to constitute a section thereof, said tubular member having a flow passage therethrough and a port intermediate the ends thereof communicating the exterior of the tubular member and said flow passage; an auxiliary valve movably carried by said tubular member and movable relative thereto between a first position wherein said port is open and a second position wherein said auxiliary valve closes said port; and a valve for closing said flow passage of said tubular member including a mandrel having a flow passage therethrough, valve means for closing said flow passage of said mandrel, and operator means for moving said valve means between open and close positions, said valve having means biasing said operator means to position holding said valve means in open position, said mandrel and said tubular member having co-engageable means for releasably holding said mandrel in a predetermined position in said tubular member, said mandrel having a port communicating with said port of said tubular member when said mandrel is in said predetermined position in said tubular member, said well tool having seal means sealing between said mandrel and said tubular member above and below said lateral ports when said mandrel is in said predetermined position, said operator means including a piston; means biasing said piston to a position holding said valve means in its open position, said piston being exposed to the pressure from the exterior of said mandrel through said port of said mandrel whereby the pressure from the exterior of the mandrel biases said piston in an opposite direction to move said valve means to its closed position, said operator means being exposed to the pressure from the exterior of said tubular member when said mandrel is in said predetermined position in said tubular member and said auxiliary valve means of said tubular member is in said open position and is responsive to said pressure for moving the valve means to closed position.

6. A well tool including: a tubular nipple connectable in a flow conductor to constitute a section thereof, said nipple having means providing an auxiliary valve chamber; an auxiliary valve movably positioned in said valve chamber, said nipple having port means providing communication between the interior and exterior thereof, said auxiliary valve when in a first position in said chamber closing said port means to prevent communication between the exterior and interior of the nipple and when in a second position permitting communication through said port means between the exterior and interior of said tubular member, said nipple having internal seal surfaces on opposite sides of said port means for engaging a well tool positionable in said nipple; and means for conducting fluid pressure from within said nipple to said auxiliary valve on opposite sides of said port means for moving said auxiliary valve in said chamber.

7. A well tool including: a tubular nipple connectable in a flow conductor to constitute a section thereof, said nipple having means providing an auxiliary valve chamber; an auxiliary valve movably positioned in said valve chamber, said nipple having port means providing communication between the interior and exterior thereof, said auxiliary valve when in a first position in said chamber closing said port means to prevent communication between the exterior and interior of the nipple and when in a second position permitting communication through said port means between the exterior and interior of said tubular member, said nipple having internal seal surfaces on opposite sides of said port means for engaging a well tool positionable in said nipple, said nipple having longitudinally spaced second port means communicating the interior of said nipple above and below said seal surfaces with said chamber on opposite sides of said auxiliary valve.

8. A well tool including: a tubular nipple connectable in a flow conductor to constitute a section thereof, said nipple having means providing an auxiliary valve chamber; an auxiliary valve movably positioned in said valve chamber, said nipple having port means providing communication between the interior and exterior thereof, said auxiliary valve when in a first position in said chamber closing said port means to prevent communication between the exterior and interior of the nipple and when in a second position permitting communication through said port means between the exterior and interior of said tubular member, said nipple having internal seal surfaces on opposite sides of said port means for engaging a well tool positionable in said nipple, said nipple having longitudinally spaced second port means communicating the interior of said nipple above and below said seal surfaces with said chamber on opposite sides of said auxiliary valve; and a valve removably positionable in said nipple for closing the flow passage of said nipple, said valve having seal means engageable with said seal surfaces between said second port means thereof communicating with said chamber whereby said longitudinally spaced second port means of said tubular member communicate with the interior of said nipple above and below said seal means and, when said valve is closed, the pressure differential between said longitudinally spaced second port means moves said auxiliary valve between said open and closed positions.

9. A valve including: a tubular mandrel having a longitudinal flow passage; valve means for closing said flow passage carried by said mandrel, operator means for moving said valve means between open and closed positions, piston means biasing said operator means to position holding said valve means in open position, said mandrel having port means communicating with the exterior of said mandrel for communicating pressure from the exterior of said mandrel to said piston means whereby said exterior pressure biases said operator means to position moving said valve to its closed position; and auxiliary valve means operatively associated with said mandrel movable to positions opening and closing said port means to control communication of pressure from the exterior of the mandrel to said piston means.

10. A valve including: a tubular mandrel having a longitudinal flow passage; valve means for closing said flow passage carried by said mandrel, operator means for moving said valve means between open and closed positions, piston means biasing said operator means to position holding said valve means in open position, said mandrel having port means communicating with the exterior of said mandrel for communicating pressure from the exterior of said mandrel to said piston means whereby said exterior pressure biases said operator means to position moving said valve to its closed position, said mandrel having external seal means above and below said port means of said mandrel for sealing between said mandrel and a flow conductor in which said mandrel is positionable, and auxiliary valve means operatively associated with said flow conductor and said mandrel movable between positions opening and closing said port means to control admission of pressure through said port means.

11. A valve including: a tubular mandrel having a longitudinal passage; a piston longitudinally slidably mounted in said passage; valve means in said passage movable by said piston between a closed position wherein said valve closes said passage and an open position wherein said valve means permits flow of fluids through said mandrel, said mandrel having lateral port means intermediate its ends communicating with the exterior of said mandrel for communicating pressure from the exterior of said mandrel to said piston to bias said piston to a position holding the valve means in closed position; and auxiliary valve means operatively associated with said mandrel adjacent said lateral port means and movable between positions opening and closing said port for controlling communication of fluid pressure from the exterior of the mandrel to said piston.

12. A well tool including: a nipple having a flow passage and connectable in a flow conductor to constitute a section thereof, said nipple having means providing a chamber exteriorly of the flow passage of said nipple, a pair of spaced ports communicating said flow passage with the chamber and with the exterior of said nipple, said nipple having auxiliary valve means movably mounted within said chamber for movement between open and closed positions, said valve means providing with said nipple an internal passage communicating said ports when said auxiliary valve means is in said open position and preventing communication between said ports through said internal passage when said auxiliary valve means is in closed position, said nipple having a third port spaced from said pair of ports and means providing with said nipple a second passage communicating said third port with one of said pair of ports; and a valve positionable in said flow passage of said nipple adjacent said third port, said valve having valve means exposed to and responsive to the pressure from said third port for closing said flow passage of said nipple.

13. The well tool of claim 12 wherein said auxiliary valve means comprises a sleeve valve movable longitudinally of said nipple between said open and closed positions, and sealing means for sealing between said nipple and said sleeve valve between said first pair of ports when said sleeve valve is in closed position.

14. The well tool of claim 13 wherein said valve sleeve has a pair of longitudinally spaced sealing surfaces, and sealing means engageable with said sealing surfaces for sealing between said nipple and said valve sleeve between said pair of ports and on opposite sides of the other of said pair of ports when said sleeve valve is in said closed position to prevent flow through said other of said pair of ports and between said valve sleeve and said nipple.

15. The well tool of claim 14 wherein said sleeve valve and said nipple have coengageable means for releasably holding said sleeve valve in said open and closed positions.

16. The well tool of claim 14, wherein said nipple has means engageable with a well tool carrying said valve and positionable therein for holding the valve of the well tool in predetermined position in the nipple adjacent said third port whereby pressure from the exterior of said nipple may be communicated through said ports of said nipple to the valve of the well tool in said nipple when said auxiliary valve is in said open position.

17. The well tool of claim 12, wherein said nipple has means engageable with a well tool carrying said valve and positionable therein for holding the well tool in predetermined position in the nipple adjacent said third port whereby pressure from the exterior of said nipple may be communicated through said ports of said nipple to the valve of the well tool in said nipple when said auxiliary valve is in said open position.

18. The well tool of claim 14, wherein said sleeve valve has means engageable by a shifting tool insertable in said sleeve valve whereby said sleeve valve is movable by said shifting tool between said open and closed positions.

19. A well tool including: a nipple connectable in a flow conductor to constitute a section thereof, and having a flow passage therethrough and a lateral port communicating with said flow passage; said nipple having an auxiliary valve housing; auxiliary valve means movably disposed in said valve housing, said housing having port means communicating with the exterior of said nipple; means communicating said housing with said port, said valve means being movable between open position wherein the pressure from the exterior of said nipple is communicated to said port and a closed position preventing communication between said port and the exterior of said housing; and control means movably disposed in said flow passage of said nipple connected to said auxiliary valve for moving said auxiliary valve between said closed and open positions.

20. The well tool of claim 19, wherein said operator means comprises a control sleeve disposed for limited movement in said flow passage of said nipple and having means engageable by a tool insertable therein for moving said control sleeve in said flow passage.

21. The device of claim 19, wherein said housing has an elongate chamber and a pair of spaced ports, one of said ports communicating said chamber with the exterior of said housing, and the other of said ports communicating the chamber with said port of said nipple, said auxiliary valve having a flow passage communicating said ports of said housing when said auxiliary valve in is open position, said auxiliary valve closing said one of said ports when in said closed position.

22. A well tool including: a nipple connectable in a flow conductor to constitute a section thereof having a flow passage therethrough and a port communicating the exterior of the nipple with said flow passage; an auxiliary valve mounted in said nipple in said flow passage for limited longitudinal movement therein between open and closed positions, said auxiliary valve having a flow passage therethrough and a port communicating with said flow passage of said auxiliary valve, said ports of said valve and nipple being in communication when said valve is in said open position, said auxiliary valve having longitudinally spaced internal seal surfaces, said port of said auxiliary valve being located between said seal surfaces, said seal surfaces being engageable by said seal means of a well tool insertable in said flow passage of said auxiliary valve whereby the pressure from the exterior of said nipple is communicated to the well tool when said auxiliary valve is in said open position.

23. The well tool of claim 22, said auxiliary valve having means engageable with a well tool receivable in its flow passage for holding the well tool in predetermined positions relative to said port of said auxiliary valve.

24. A well tool including: a nipple connectable in a flow conductor to constitute a section thereof having a flow passage therethrough and a port communicating the exterior of the nipple with said flow passage; an auxiliary valve mounted in said nipple in said flow passage for limited longitudinal movement therein between open and closed positions, said auxiliary valve having a flow passage therethrough and a port communicating with said flow passage of said auxiliary valve, said ports of said valve and nipple being in communication when said valve is in said open position, said auxiliary valve having longitudinally spaced internal seal surfaces, said port of said auxiliary valve being located between said seal surfaces; and a valve positionable in said flow passage of said auxiliary valve for closing said flow passage, said valve having means exposed to and responsive to the pressure from exteriorly of said nipple through said ports of said nipple and said auxiliary valve when said auxiliary valve is in said closed position, said valve having seal means engageable with said seal surfaces of said auxiliary valve for sealing therebetween, said seal surfaces being engageable by said seal means of a well tool insertable in said flow passage of said auxiliary valve whereby the pressure from the exterior of said nipple is communicated to the well tool when said auxiliary valve is in said open position.

25. The well tool of claim 24 wherein said means exposed to and responsive to the pressure from exteriorly of said nipple through said ports of said nipple and said auxiliary valve when said auxiliary valve is in said closed position is also exposed to and responsive to the pressure from interiorly of said nipple and moves said valve to close said flow passage when a predetermined pressure differential occurs between the exterior and the interior of said nipple.

26. The well tool of claim 25 and equalizing valve means carried by said means exposed to and responsive to the pressure from exteriorly of said nipple and openable to equalize the pressure within said nipple and the exterior thereof.

27. The well tool of claim 24 and equalizing valve means carried by said means exposed to and responsive to the pressure from exteriorly of said nipple and openable to equalize the pressure within said nipple and the exterior thereof.

References Cited by the Examiner
UNITED STATES PATENTS

| | | | |
|---|---|---|---|
| 2,998,075 | 7/1957 | Clark | 166—224 |
| 3,007,669 | 11/1961 | Fredd | 166—224 |
| 3,126,908 | 3/1964 | Dickens | 166—224 |

CHARLES E. O'CONNELL, *Primary Examiner.*

J. A. LEPPINK, *Assistant Examiner.*